United States Patent [19]

Neupauer

[11] Patent Number: 4,665,474
[45] Date of Patent: May 12, 1987

[54] METHOD AND DEVICE FOR RAPIDLY DETERMINING A SYNCHRONOUS REFERENCE VOLTAGE FOR A NETWORK CONTROLLED CONVERTER

[75] Inventor: Helmut Neupauer, Erlangen, Fed. Rep. of Germany

[73] Assignee: Siemens Aktiengesellschaft, Munich, Fed. Rep. of Germany

[21] Appl. No.: 681,257

[22] Filed: Dec. 13, 1984

[30] Foreign Application Priority Data

Dec. 21, 1983 [DE] Fed. Rep. of Germany ....... 3346291

[51] Int. Cl.$^4$ .............................................. H02J 3/36
[52] U.S. Cl. ...................................... 363/35; 363/40; 363/51
[58] Field of Search ........................ 363/35, 40, 44, 51

[56] References Cited

U.S. PATENT DOCUMENTS

| | | | |
|---|---|---|---|
| 3,683,262 | 8/1972 | Neuffer et al. | 363/35 |
| 3,796,935 | 3/1974 | Blaschke | 318/801 |
| 3,824,437 | 7/1974 | Blaschke | 318/803 |
| 4,238,715 | 12/1980 | Parsch et al. | 318/135 |
| 4,555,755 | 11/1986 | Kurosawa et al. | 318/803 |

FOREIGN PATENT DOCUMENTS 2816661 10/1979 Fed. Rep. of Germany .
2816614 2/1980 Fed. Rep. of Germany .
3303454 8/1984 Fed. Rep. of Germany .

Primary Examiner—Patrick R. Salce
Assistant Examiner—Jeffrey Sterrett
Attorney, Agent, or Firm—Kenyon & Kenyon

[57] ABSTRACT

The orthogonal components of the voltage vector of an a-c voltage network are transformed by means of a vector rotator, smoothed and transformed back. The frequency of the transformation elements required for the transformation in the vector rotator is set during a network disturbance under controlled conditions in accordance with a stored frequency value. After the end of the network disturbance, the direction given by the smoothed transformed orthogonal components is controlled to a reference value in that the frequency of the transformation elements is readjusted according to the direction deviation. The phase of the transformation elements determines the phase of the co-system fundamental of the network. A counter system fundamental can also be taken into consideration. Also if the returning power network contains asymmetrical and harmonic containing transients, a reference voltage synchronous with the fundamental can be obtained thereby within a few milliseconds for synchronizing network controlled converters.

16 Claims, 18 Drawing Figures

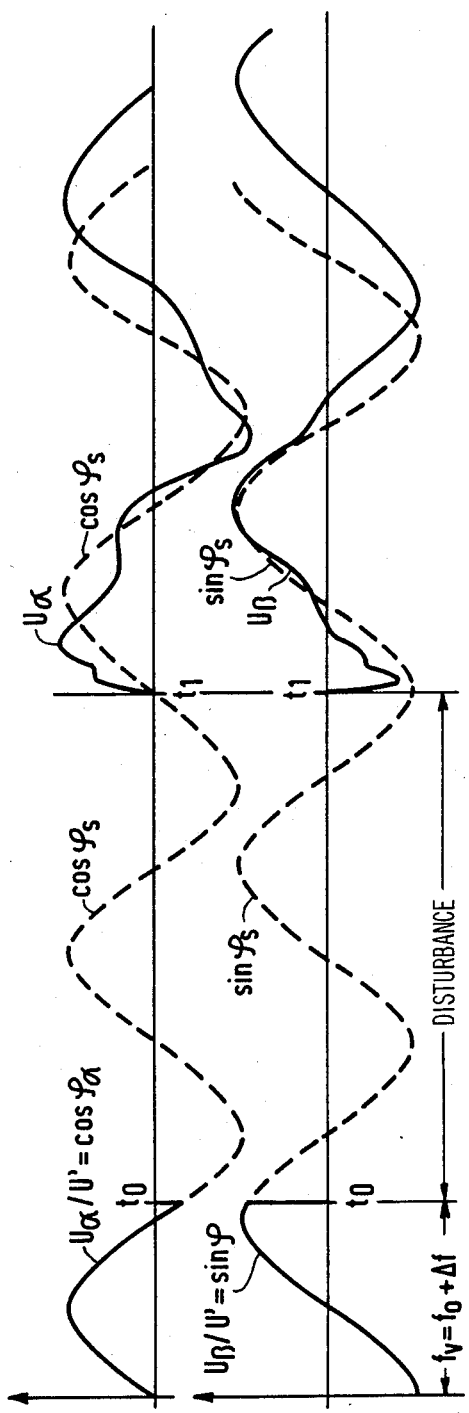
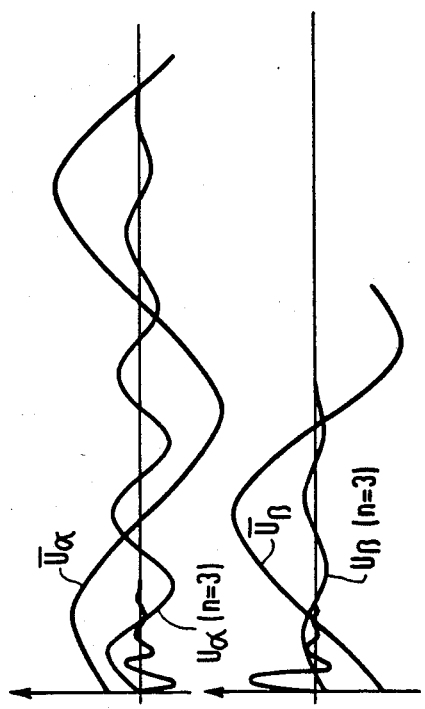
FIG 4
FIG 5

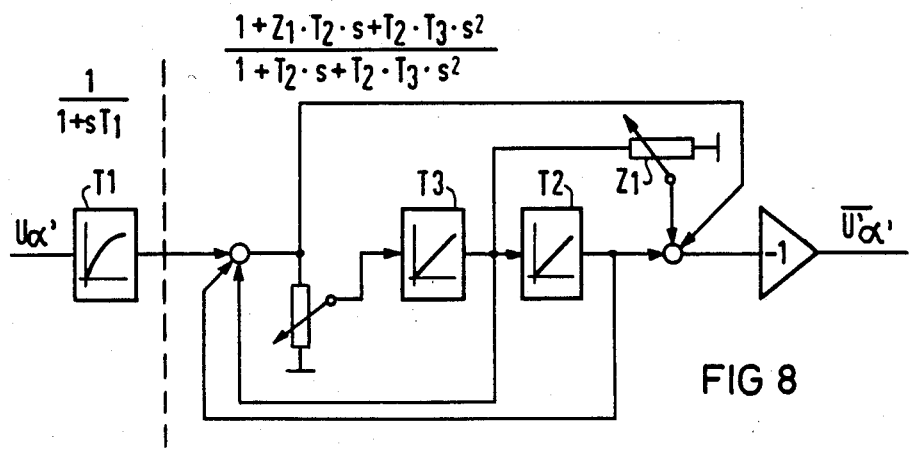
FIG 8
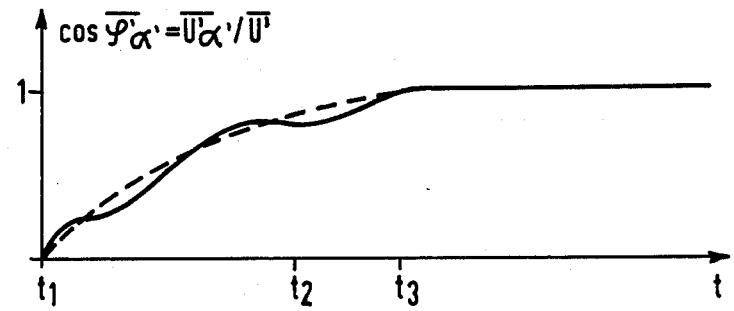
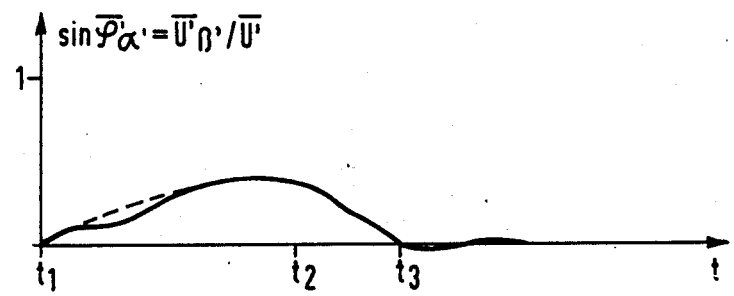
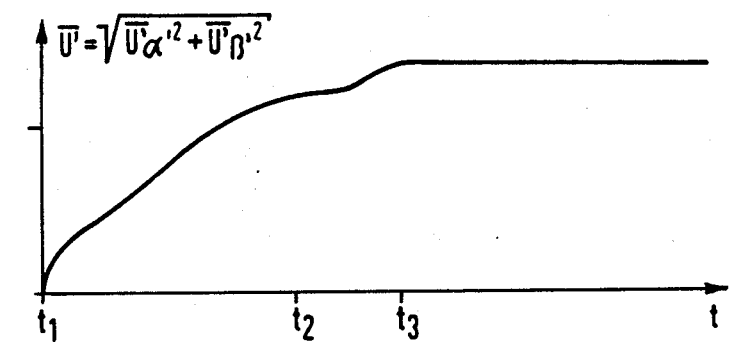
FIG 9

1

METHOD AND DEVICE FOR RAPIDLY DETERMINING A SYNCHRONOUS REFERENCE VOLTAGE FOR A NETWORK CONTROLLED CONVERTER

BACKGROUND OF THE INVENTION

This invention relates to network controlled converters in general and more particularly to an improved method and device for determining a reference voltage synchronous with the network for a control set of network controlled converter, especially in an a-c network having harmonics, after a network disturbance.

A device for smoothing vector component voltages with the correct phase is described in German Offenlegungsschrift No. 20 19 263. In the disclosed device, two voltages are visualized as orthogonal components of a vector in an orthogonal reference system fixed in space and fed to the vector input of a vector rotator. Two normalized voltages which, as the sine and cosine of a variable angle, correspond to the Cartesian coordinates fixed in space of a unit vector rotating at a transformation frequency are fed to the angle signal input of the vector rotator. These normalized voltages serve as transformation elements for a coordinate transformation so that the vector rotator supplies the orthogonal components of the vector in a reference system rotating synchronously with the unit vector at its output. The quotient of these rotating orthogonal components corresponds to the tangent of the angle coordinate of the transformed vector and is fed to a controller, the output signal of which is entered as a frequency proportional control voltage into a sine and cosine generator for forming the normalized voltages for the angle signal input of the vector rotator. As a result, the rotating unit vector is slaved to the given vector in such a manner that the angle coordinate in the rotating reference system becomes zero. The transformed component of the vector which is parallel to the unit vector, is fed to a further controller, the output signal of which represents the amplitude of the vector when the angle coordinate is adjusted. Through multiplication of this amplitude by the outputs of the sine-cosine function generator, the desired smoothed orthogonal vector components fixed in space are then produced.

In unpublished German patent application P No. 33 03 454.0, this method is expanded for a low noise frequency measurement on a multiphase line system for the transmission of electric power. If, for instance, the frequency of an a-c voltage network is to be determined, two voltage signals which determine an actual vector describing the network voltage system in a reference system fixed in sapce are formed from measurement values. These vector components fixed in space are converted by a frequency transformation which is performed by the mentioned vector rotator, into two frequency transformed, orthogonal, slaved system components. The frequency of the transformation elements, i.e., the frequency of the unit vector fed in at the angle signal input of the vector rotator, is now determined in that a reference value is given for the angle coordinate of the transformed vector, and the control deviation of the angle coordinate from this reference value is leveled out. In this arrangement, anticipatory control for the frequency of the transformation elements with the nominal frequency of the a-c network which represents the approximate mean value of the network frequency is supplied. As long as the a-c voltage network is present, the frequency of the variable frequency transformation elements corresponds, in the balanced condition, to the desired network frequency so that the oscillation frequency is taken off directly as the desired frequency measurement value at the frequency control input of the sine-cosine generator.

In network controlled converter systems, for instance, in converters for feeding into a given voltage network and, in particular, for feeding into a high voltage d-c transmission system, it is frequently required that the energy transport which is interrupted during a disturbance of the network by a blockage of the converter be resumed as fast as possible after the distrubance has ended. A condition for the restarting of such a network controlled converter system is that a correct phase of reference voltage be available, if possible, immediately for synchronizing the control unit of this system. In these applications, therefore, not only the frequency but also a rapid and correct determination of the phase of the network is required.

The recurring voltage, however, consists not only of a suddenly switched on fundamental. In addition, harmonics with unknown frequency as well as transients with different unknown frequencies and decaying amplitudes occur, where these harmonic components represent an asymmetrically decaying system. These harmonics are not necessarily integral multiples of the network frequency, even if they begin as a rule with the second harmonic and frequently contain dominant harmonic oscillations of the third and higher order.

It is, thus, an object of the present invention to describe a method and a device which permit making available a network sychronized reference voltage by which the control unit of a network controlled converter can be controlled without the danger of commutation faults, as soon as possible after the end of a network disturbance.

BRIEF DESCRIPTION OF THE DRAWINGS

FIG. 4 illustrates waveforms of the orthogonal components of the network voltage system.

FIG. 5 illustrates waveforms of the frequency components of these orthogonal components.

FIGS. 7 and 8 are graphs of the amplitude factor and circuit of the smoothing members, respectively.

FIGS. 9 and 10 illustrate the signal waveforms which are obtained with the device according to FIG. 1.

DETAILED DESCRIPTION

Figure 1:
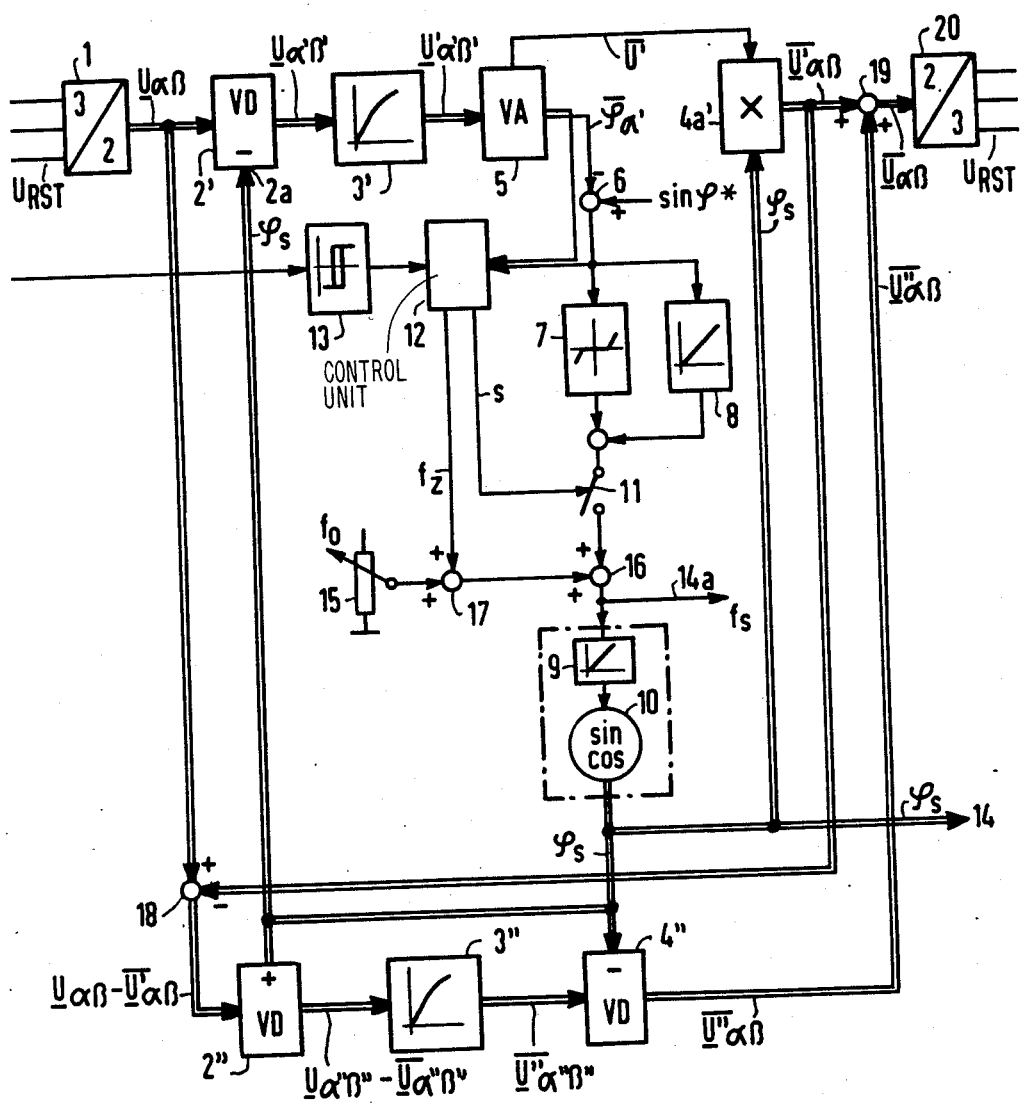
FIGS. 1 and 2 are block diagrams of a first embodiment of the present invention.

In FIG. 1, a first advantageous embodiment of the present invention is shown schematically by the example of a three-phase network, with the following components:

From the phase voltages $U_R$, $U_S$, $U_T$ of the network voltage system $U_{RST}$, a 3/2 transformer 1 forms, as a network determining member, two a-c voltage components $U_\alpha$, $U_\beta$. These describe completely, at least for the most frequent case $U_R+U_S+U_T=0$, at any instant, the network voltage system where they can be visualized as components of a vector $\underline{U}_{\alpha\beta}$, the basis of which is a coordinate system of two orthogonal axes $\underline{\alpha}$, $\underline{\beta}$ fixed in space. If a null system $U_O=U_R+U_S+U_T$ is present, then the device shown in FIG. 1 can likewise be used by splitting off this null component $U_O$ from the network voltage system and further processing it separately in the same manner.

A first vector rotator 2' transforms the components fixed in space into a rotating reference system which is based on the orthogonal axes $\underline{\alpha}'$; $\underline{\beta}'$. The transformation angle $\phi_s$ between the axes $\underline{\alpha}$ and $\underline{\alpha}'$ is fed to the vector rotator 2' at its angle input 2a in the form of the transformation elements $\cos \phi_s$ and $\sin \phi_s$ with the transformation frequency $f_s=2\pi d\phi_s/dt$. In this rotating reference system, the actual vector has the transformed components $U_\alpha'$, $U_\beta'$, which fix the actual value vector in the form of the transformed vector $\underline{U}_{\alpha'\beta'}$.

A first smoothing stage 3' forms, from the transformed components, by smoothing, the components $\overline{U'_{\alpha'}}$ and $\overline{U'_{\beta'}}$ which are designated as "transformed co-system components" and determine a vector $\overline{\underline{U}}_{\alpha'\beta'}$. The polar angle coordinate of this vector $\overline{\underline{U}'}_{\alpha'\beta'}$ will be designated with $\overline{\phi'_{\alpha'}}$ in the following.

A vector analyzer 5, acting as a phase difference former, furnishes at its angle signal output an angle signal pair $\cos \overline{\phi'_{\alpha'}}$, $\sin \overline{\phi'_{\alpha'}}$ for this angle coordinate $\overline{\phi'_{\alpha'}}$ shown as a double arrow, wherein the individual signal $\sin \overline{\phi'_{\alpha'}}$ can be compared with a reference value $\sin \phi^*$ at a summing junction 6. For small angles $\overline{\phi'_{\alpha'}}$ and $\phi^*$, this control deviation corresponds to the sine function of the control deviation of the corresponding angles. The reference value $\phi^*$ determines in the rotating $\underline{\alpha}'$, $\underline{\beta}'$ system an axis which is equal to the $\alpha'$ axis, especially for $\phi^*=0$, so that the control summing junction point 6 can be omitted in this preferred case. There follows a control amplifier 7, by which the control deviation can be leveled out with a control loop gain which increases more than proportionally for increasing values. Thereby, a nonlinearity generated by the use of the sine function can be compensated or overcompensated. Since in this case, an integrating behavior is desired for the phase control provided, this nonlinear control amplifier 7 is shunted by an integrating controller 8 for generating an integrating gain component.

The phase difference former 5 is followed by a final control element which forms the components, fixed in space, of the rotating reference axis $\underline{\alpha}'$, i.e., the variables $\cos \phi_s$ and $\sin \phi_s$, which are fed as transformation elements to the angle signal input 2a of the first vector rotator 2'. In FIG. 1, this final control element consists of an integrator 9 which is fed by the amplified control deviation and which is followed by a sine-cosine generator 10. The transformation frequency $f_s$, by means of which the transformation angle $\phi_s$ of the transformation elements can be varied, is therefore controlled by this arrangement in such a manner that, in the balanced condition, $\overline{\phi'_{\alpha'}}=\phi_s+\phi^*$, i.e., for $\phi^*=0$ the direction of the co-system vector $\underline{U}_{\alpha'\beta'}$ falls on the $\alpha'$ axis which is determined by the transformed co-system components.

Between the phase difference former 5 and the final conrol element, a switch 11 is provided, by means of which the frequency input of the transformation elements can be switched between control by a stored frequency value $f_O$ for a network distrubance (switch 11 open) and control using the output of phase difference former 5 (switch 11 closed) so that the controller can level out the control deviation formed by the phase difference former 5 after the a-c voltage network returns. In the circuit according to FIG. 1, the stored frequency value $f_O$ which can be set, in particular, to the nominal frequency of the network, is impressed on the frequency control input 16 of the control element even in the case of an undisturbed network voltage. This is equivalent to an anticipatory control of the transformation frequency with the stored frequency $f_O$ which corresponds to a predetermined mean value for the network frequency.

The switch 11 is actuated by control device 12 in dependence on a distrubance signal which is formed by a network monitor 13 and indicates the beginning and the end of the network disturbance. To shorten the transient, the control device 12 also forms a quantized value of the control deviation from the transient, i.e., the angle signal of the vector analyzer, and intervenes with this quantized value temporarily into the control or regulation of the transformation frequency in such a manner that the phase of the transformation frequency is shifted by this quantized value. This is accomplished by temporarily impressing an additional frequency value $f_z$ on the frequency control input of the final control element using summing junction 17.

The phase $\phi_s$ of the transformation elements corresponds, in the balanced state, as will be explained below, directly to the phase of the co-system fundamental of the network. If it is sufficient to pick up only the co-system fundamental phase as the network-synchronous reference signal, then the signal pair $\cos \phi_s$, $\sin \phi_s$ can be taken off as the reference signal, for instance, directly at the output 14. If, on the other hand, the amplitude of the co-system fundamental is also required for the reference signal, the transformation elements can be weighted with this amplitude. In FIG. 1, this is accomplished by feeding the magnitude output U' of the vector analyzer 5 to a multiplier 4a' for the transformation elements.

In general, the fundamental of the voltage system also contains a counter system which is to be taken into consideration in forming the network synchronous reference voltage. According to FIG. 1, the components $\overline{U'_\alpha}$ and $\overline{U'_\beta}$ of the co-system vector $\overline{\underline{U}'}_{\alpha\beta}$, which are made available by the multiplier 4a' as orthogonal components, fixed in space, are subtracted from the corresponding components, fixed in space, $U_\alpha$ and $U_\beta$, of the actual vector $\underline{U}_{\alpha\beta}$. The difference vector $\underline{U}_{\alpha\beta}-\overline{\underline{U}'}_{\alpha\beta}$ formed by the corresponding summing junction 18 is transformed by means of a second vector rotator 2'', also addressed by the transformation elements $\cos \phi_s$, $\sin \phi_s$, into a counter rotating reference system. This second reference system is based on the Cartesian axis $\underline{\alpha}''$ and $\underline{\beta}''$, where the $\alpha''$ axis rotates with the frequency $-f_s$, i.e., encloses the angle $-\phi_s$ relative the $\alpha$ axis which is fixed in space. In the $\alpha''$, $\beta''$ system, the actual vector has the orthogonal components $\underline{U}_{\alpha''}$ and $U_{\beta''}$, which describe a vector $\underline{U}_{\alpha''\beta''}$. These vector components are smoothed in a second smoothing stage 3'', the output signals $\overline{U''_{\alpha''}}$ and $\overline{U''_{\beta''}}$ of which determine in the $\alpha'',\beta''$ system a vector $\overline{\underline{U}''}_{\alpha''\beta''}$ designated as a "counter system vector".

A further phase rotator 4'' connected thereto now transforms these counter system components $\overline{U''_{\alpha''}}$ and $\overline{U''_{\beta''}}$ back into the $\alpha\beta$, system fixed in space and thus converts these counter system components $\overline{U''_{\alpha''}}$ and $\overline{U''_{\beta''}}$ into the components $U''_\alpha$ and $U''_\beta$ fixed in space of the counter system vector $\overline{U''_{\alpha\beta}}$ of the fundamental.

A summing junction 19 is used for vectorially adding the two vectors $\overline{U'_{\alpha\beta}}$ and $\overline{U''_{\alpha\beta}}$, so that then the sum vector $\overline{U_{\alpha\beta}} = \overline{U'_{\alpha\beta}} + \overline{U''_{\alpha\beta}}$ which describes the entire fundamental, and to which the corresponding fundamentals $U_R$, $U_S$ and $U_T$ of the phase voltages can be assigned is available.

Figure 2:
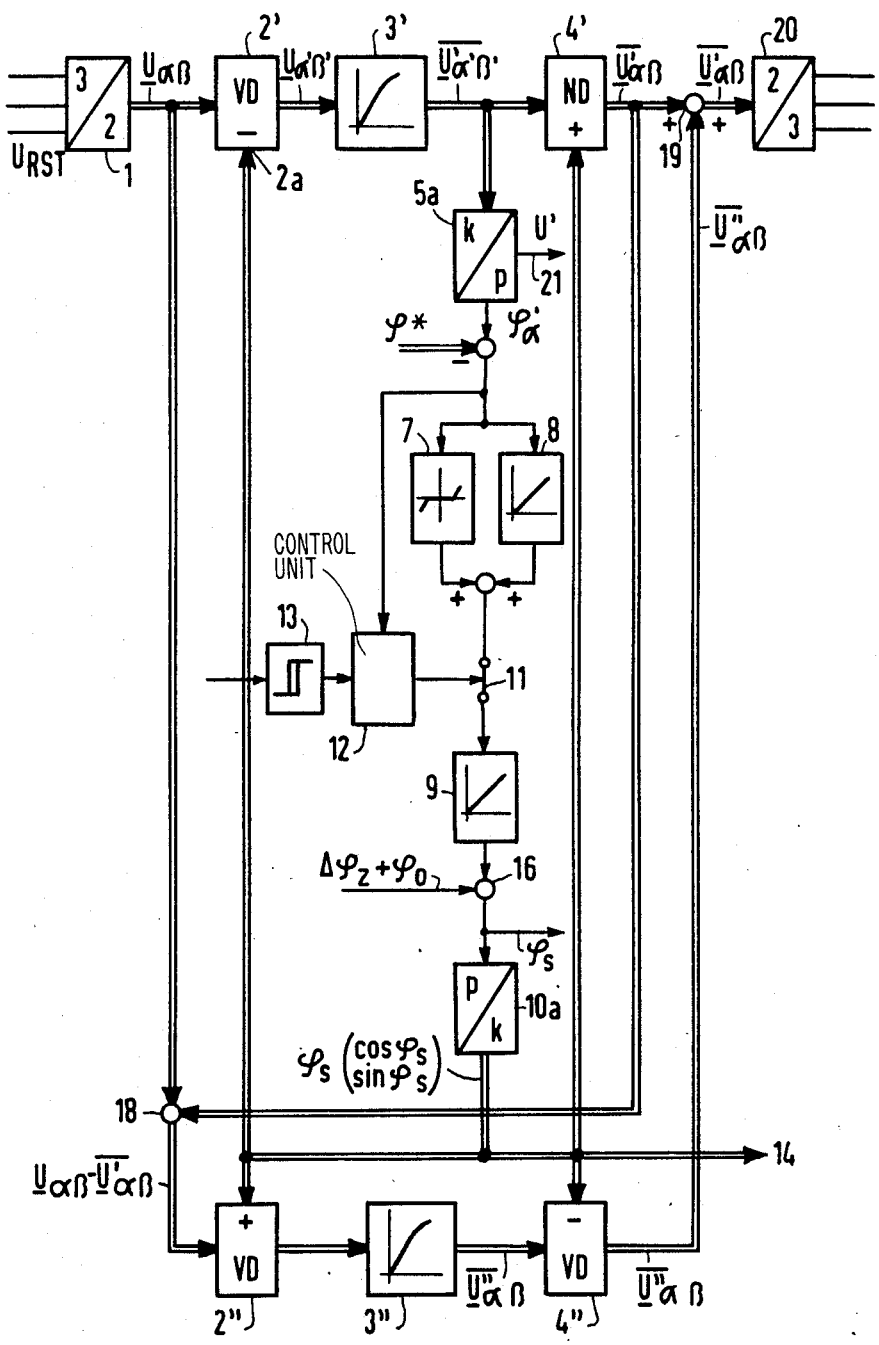

FIG. 2 shows a somewhat modified embodiment, in which the components designated by the same reference symbols as in FIG. 1 are retained without change. Instead of the multiplier 4a' addressed by the magnitude coordinate U' of the transformed co-system vector $\overline{U'_{\alpha'\beta'}}$, a vector rotator 4' inverse to the first vector rotator 2' is used for the transformation elements. This vector rotator transforms the components $\overline{U'_{\alpha'}}$ and $\overline{U'_\beta}$, from the α', β' system rotating with the frequency of the transformation elements back into the system fixed in space; it therefore furnishes the same output signal as the multiplier 4a' without the magnitude $\overline{U'}$ itself being required for this purpose.

This magnitude, however, is formed in a Cartesian-polar coordinate converter 5a and can be taken off at the output 21. The angle coordinate $\overline{\phi'_{\alpha'}}$ of $\overline{U'_{\alpha'\beta'}}$ can be used together with the reference value φ* directly for forming the control deviation. For the anticipatory control of the transformation frequency with the stored frequency $f_o$, the summing junction 16 is connected to the output of integrator 9 and is used for providing anticipatory control for the integrator output signal which determines the transformation phase $\phi_s$ of the frequency transformations, with the anticipatory control angle $\phi_0$ which in turn must be variable with the stored frequency $f_0$ and the phase of which can be shifted, if desired, by an additional constant phase angle $\Delta\phi_z$ according to the short-term imposition of the additional frequency value $f_z$.

At the output of the summing junction 16 the phase $\phi_s$ of the transformation elements, which is converted into $\cos \phi_s$, $\sin \phi_s$ by a polar-Cartesian converter 10a in accordance with the function generator 10 is, therefore, present.

The operation of the arrangement will be explained in greater detail with the aid of a typical voltage waveform with a voltage break such as is shown for the three-phase voltages $U_R$, $U_S$ and $U_T$ in FIG. 3. It is seen that the network contains, prior to the disturbance, three sine waves practically shifted in phase by 120° relative to each other (symmetrical system), but then exhibits after the disturbance initially not only strong, decaying harmonics but an asymmetry which can be recognized from the fact that the individual voltage curves deviate from each other not only by a phase shift.

The 3/2 transformer 1 and the ⅔ transformer 20 inverse thereto represent the relationship between the individual phase voltages and the Cartesian vector components which describe these voltages, according to $$U_\alpha = (2U_R - U_S - U_T)/3 \qquad (1)$$

$$U_\beta = (U_S - U_T)/\sqrt{3}$$

and $$U_R = U_\alpha \qquad (2)$$

$$U_S = (-U_\alpha + \sqrt{3}\, U_\beta)/2$$

$$U_T = (-U_\alpha + \sqrt{3}\, U_\beta)/2$$

The polar coordinates, i.e., the amount and angle of this vector, are given by $$U = \sqrt{U_\alpha^2 + U_\beta^2} \qquad (3)$$

$$\phi_\alpha = \arctan(U_\beta/U_\alpha)$$

Such a computing stage, which is addressed by input signals corresponding to Cartesian coordinates and determines therefrom polar coordinates, is known as a Cartesian/polar or "k/p" converter and is described, for instance, in German Offenlegungsschrift No. 28 16 661. The inverse conversion from polar coordinates into Cartesian coordinates can be performed by a polar/Cartesian or "p/k" converter according to German Offenlegungsschrift No. 28 16 614.

The angle coordinate $\phi_\alpha$ of the vector $U_{\alpha\beta}$ described by $U_\alpha$ and $U_\beta$, can be thought of, because of $U_R = U_\beta$ as the phase angle of the voltage $U_R$ or as the phase of the entire network voltage system. If this phase of the network voltge system is further thought of as the angle between the actual vector $U_{\alpha\beta}$ and the axis α of the Cartesian coordinate system α, β, a coordinate system fixed in space is determined thereby.

To illustrate the operation according to FIG. 2, the undisturbed symmetrical oscillation will be considered first. It is assumed that the device already furnishes, at the output 14, transformation elements $\cos \phi_s$, $\sin \phi_s$, the transformation phase $\phi_s$ of which is shifted relative to the phase of the network by a phase difference given by the reference value φ*.

In the α, β system fixed in space, $\cos \phi_s$, $\sin \phi_s$, represent the Cartesian components of a unit vector $\underline{a}'$, which is rotated relative to the α axis by the transformation angle $\phi_s$. Since the transformation variable with the transformation frequency $f_s = 2\pi d\phi_s/dt$, the axis α' and an axis β' orthogonal thereto represent a coordinate system which rotates relative to the α, β system. The vector rotator 2' forms therefrom the transformed orthogonal components:

$$U_{\alpha'} = U_\alpha \cos \phi_s + U_\beta \sin \phi_s$$

$$U_{\beta'} = -U_\alpha \sin \phi_s + U_\beta \cos \phi_s \qquad (4)$$

The corresponding, transformed vector $\underline{U}_{\alpha'\beta'}$, thus, describes the same physical state of the network; a k/p converter would, therefore, furnish the same network voltage amplitude U for the magnitude coordinate $\sqrt{U_{\alpha'}^2 + U_{\beta'}^2}$ and only the angle coordinate of this transformed vector is now obtained according to $\phi_{\alpha'} = -\tan^{-1} U_{\beta'}/U_{\alpha'}$ by the angle between the transformed vector and the α' axis.

For the undisturbed network (assumed to be symmetrical) in the left part of FIG. 2, the ⅔-converter 1 and the vector rotator 2', therefore, form the output quantities:

$U_{RST}$ symmetrical; $U_\alpha = U \cos \phi$ hd α and $$U_\beta + U \sin \phi_\alpha$$

and $$U_{\alpha'} = U \cos(\phi_\alpha - \phi_s) = U \cos \phi_{\alpha'}$$

$$U_{\beta'} = U \sin(\phi_\alpha - \phi_s) = U \sin \phi_{\alpha'}$$

with $$\phi_{\alpha'} = \phi_\alpha - \phi_s \quad (4a)$$

The vector $\underline{U}_{\alpha\beta}$, therefore, rotates uniformly in the $\alpha, \beta$ system and, if in the stationary balanced state the transformation phase $\phi_s$ is synchronous with the network phase $\phi_s$, as assumed, the vector rotator 2' furnished two constant transformed orthogonal components. The transformed network phase $\phi_\alpha$ is accordingly constant. Consequently, the smoothing stage 2, (for instance, the filter for each component) is not loaded and the mean values present at its outputs are equal to the input values.

The vector rotator 4' now transforms this vector, designated as the "co-system vector" from the rotating $\alpha', \beta'$ system back into the $\alpha, \beta$ system fixed in space. This inverse transformation corresponds to the transformation (4), where only the sign of the transformation angle $\phi_s$ is negative, i.e., the vector rotator input is changed.

If the mean value formation which is performed by the smoothing member 3', is designated by a bar over the input variables, "orthogonal co-system components" $\overline{U'_{\alpha'}}$ and $\overline{U'_{\beta'}}$ of a "co-system vector" $\overline{\underline{U}'_{\alpha'\beta'}}$ (or the corresponding polar coordinates $\overline{U'}$, $\overline{\phi'_{\alpha'}}$ of this vector) in the $\alpha', \beta'$ system can be defined as $$\overline{U'_{\alpha'}} \equiv \overline{U\cos(\phi_\alpha - \phi_s)}, \quad \overline{U'_{\beta'}} \equiv \overline{U\sin(\phi_\alpha - \phi_s)} \quad (5)$$

and $$\overline{U'} \equiv \sqrt{\overline{U'_{\alpha'}}^2 + \overline{U'_{\beta'}}^2}, \quad \overline{\phi'_{\alpha'}} = \tan^{-1}(\overline{U'_{\beta'}}/\overline{U'_{\alpha'}})$$

The k/p converter therefore forms, from the output variables of the smoothing member 3' (i.e., the Cartesian vector components, according to the first definition equations), the corresponding polar vector components (corresponding to the Cartesian/polar coordinate conversion mentioned below). Thereby, the coordinate converter 5a furnishes for small angle values ($\overline{\phi'_{\alpha'}} \approx 0$), the actual angle value $\sin \overline{\phi'_{\alpha'}} \approx \overline{\phi'_{\alpha'}}$ which is required for slaving the transformation angle $\phi_s$ and which is obtained by this special way of forming the mean value from the actual values of the network.

The second vector rotator 4' transforms the Cartesian components $\overline{U'_{\alpha'}}$ and $\overline{U'_{\beta'}}$ of this vector back into the $\alpha, \beta$ system, fixed in space and, therefore, forms the orthogonal components $\overline{U'_\alpha}$ and $\overline{U'_\beta}$, fixed in space, of the co-system:

$$\overline{U'_\alpha} = \overline{U'} \cdot \cos(\overline{\phi'_{\alpha'}} + \phi_s)$$

$$\overline{U'_\beta} = \overline{U'} \cdot \sin(\overline{\phi'_{\alpha'}} + \phi_s) \quad (6)$$

with the angle coordinate $\overline{\phi'_\alpha} = (\overline{\phi'_{\alpha'}} + \phi_s)$.

For the symmetrical system according to (4a), for which $\phi_\alpha - \phi_s = \phi_{\alpha'}$ according (5), the mean values:

$$\overline{U'_{\alpha'}} = U \cdot \cos\phi_{\alpha'} = \text{const.}$$

$$\overline{U'_{\beta'}} = U \cdot \sin\phi_{\alpha'} = \text{const.}$$

$$\overline{U'} = \sqrt{(U\cos\phi_{\alpha'})^2 + (U\sin\phi_{\alpha'})^2} = U$$

$$\overline{\phi'_{\alpha'}} = \tan^{-1}(U\sin\phi_{\alpha'}/U\cos\phi_{\alpha'}) = \phi_{\alpha'}$$

A comparison with (4a) therefore shows that the co-system vector $\overline{U'_{\alpha'\beta'}}$ in the $\alpha', \beta'$ system actually agrees as to amount $\overline{U'}$ and direction $\overline{\phi'_{\alpha'}}$ with the vector $\underline{U}_{\alpha'\beta'}$ of the actual network, where one has, due to the control condition $\overline{\phi'_{\alpha'}} = \phi^*$, $\phi_{\alpha'} = \phi^*$ for the balanced state. The vector rotator 4' (phase shift $\overline{\phi'_{\alpha'}} \to \overline{\phi'_\alpha} = \overline{\phi'_{\alpha'}} + \phi_s$), which is inverted with respect to the vector rotator 2' (phase shift $\phi_\alpha \to \phi'_{\alpha'} = \phi_\alpha - \phi_s$), therefore furnishes:

$$\phi_\alpha = \overline{\phi'_\alpha} = \phi^* + \phi_s$$

$$U_\alpha = \overline{U'_\alpha} = \overline{U} \cdot \cos \overline{\phi'_\alpha} = \overline{U} \cos(\phi^* + \phi_s)$$

$$U_\beta = \overline{U'_\beta} = \overline{U} \cdot \sin \overline{\phi'_\alpha} = \overline{U} \sin(\phi^* + \phi_s)$$

Actually, the signals $\phi_s$ and $\underline{\phi}_s = (\cos \phi_s, \sin \phi_s)$ taken off at the outputs 14 or 16 represent the normalized voltages of the network with the rigid predeterminable phase shift $\phi^*$. The multiplier 4a' of FIG. 1 and the vector rotator 4' of FIG. 2 are equivalent as to their output signals which describe, as the vector $\overline{U'_{\alpha\beta}}$, the corresponding, non-normalized network voltages.

The network frequency is given here by the transformation frequency $f_s = 2\pi d\phi_s/dt$ and can be taken off directly at the integrator input 14a (FIG. 1).

Regarding the operation of the final control element for the transformation elements, it should be explained that the components 9 and 10 in FIG. 1 as well as 9 and 10a in FIG. 2 represent a vector oscillator with anticipatory control. In the case of FIG. 1, the integrator 9 (for instance, a frequency-controlled oscillator with a resettable counter connected thereto) forms, for $f_z = 0$, an angle $\phi_0 = 2\pi \int f_0 dt$ which is converted by a function generator (for instance, a ROM) into $\sin \phi_0$ and $\cos \phi_0$. Impressing the control deviation $(\phi^* - \overline{\phi'_{\alpha'}})$ and $(\sin \phi^* - \sin \overline{\phi'_{\alpha'}})$ respectively, means that this frequency and therefore, the angle are changed until the control deviation disappears. The control amplifier made up of elements 7 and 8 then form exactly that signal $\Delta f = f_s - f_0$, by which the transformation elements are readjusted until $\overline{U'_{\alpha'\beta'}}$ (i.e., the averaged transformed actual vector) agrees with the $\phi^*$ direction in the rotating $\alpha'\beta'$ system (or the averaged actual vector transformed back with the corresponding $\phi^*$ direction in the reference system fixed in space) and thus, phase equality between the transformation elements (transformation phase $\phi_s$) and the network fundamental prevails.

So far, the determination of the fundamental in a symmetrical system has been described. Such symmetrical systems have two degrees of freedom (amplitude and phase), where the individual voltages of this voltage system deviate from each other by a phase shift only. In the more general case, however, the fundamental wave of the network voltage system (fundamental $\overline{f}$) is composed of individual harmonic oscillations of this frequency, which each by themselves have two degrees of freedom; i.e., we have:

$$U_R = |U_R| \cos(2\pi \bar{f} t + \phi_R)$$

$$U_S = |U_R| \cos(2\pi \bar{f} t + \phi_S)$$

$$U_T = |U_T| \cos(2\pi \bar{f} t + \phi_T) \qquad (7)$$

The assumed relationship $U_R + U_S + U_T = 0$ reduces the number of degrees of freedom to four. The 3/2 transformer then forms, relative to the three-phase system, the two orthogonal components $U_\alpha$ and $U_\beta$ which can be visualized as the superposition of two symmetrical systems ("co-system", degrees of freedom: amplitude $\overline{U}'$, phase $\overline{\phi}'_\alpha$; "counter system", degrees of freedom: amplitude $\overline{U}''$, phase $\overline{\phi}''_\alpha$). By $$U_\alpha = \overline{U}' \cdot \cos(2\pi \bar{f} t + \overline{\phi}'_\alpha) + \overline{U}'' \cos(-2\pi \bar{f} t - \phi''_\alpha)$$

$$U_\beta = \overline{U}' \cdot \sin(2\pi \bar{f} t + \phi'_\alpha) + \overline{U}'' \sin(-2\pi \bar{f} t - \phi''_\alpha)$$

$$U_\alpha = \overline{U'_\alpha} + \overline{U''_\alpha}, \quad U_\beta = \overline{U'_\beta} + \overline{U''_\beta} \qquad (8)$$

the vector $\underline{U}_{\alpha\beta}$ is therefore represented at the output of the converter 1 as the vectorial sum of two vectors $\overline{U'}_{\alpha\beta}$ and $\overline{U''}_{\alpha\beta}$. The co-system vector $\overline{U'}_{\alpha\beta}$ rotates in the $\alpha, \beta$ system in the positive direction, but the counter system vector $\overline{U''}_{\alpha\beta}$ in the opposition sense. Consequently, the transformation (4) in the vector rotator 2' yields a transformed actual vector $\overline{U}_{\alpha'\beta'}$ as the vectorial sum of two transformed vectors. The transformed co-system rests in this $\alpha', \beta'$ system which rotates in the same sense, and its transformed orthogonal components accordingly correspond to the average values formed by the smoothing stage 3'. The transformed counter system vector, on the other hand, rotates in the rotating $\alpha', \beta'$ system in the opposite sense and with twice the frequency; its transformed orthogonal components are, therefore, averaged out by the smoothing stage 3'. Therefore, the smoothing stage 3' with the smoothed vector $\overline{U'}_{\alpha'\beta'}$ furnishes in the co-rotating $\alpha', \beta'$ system the instantaneous co-system which describes the co-system vector $\overline{U'}_{\alpha\beta}$ after being transformed back into the $\alpha, \beta$ system fixed in space.

If, however, the entire fundamental is to be determined according to (7), for instance, for controlling a network controlled frequency converter, this can be accomplished by also transforming the actual vector $\underline{U}_{\alpha\beta}$ into a reference system with the reference axes $\alpha''$, $\beta''$ rotating in the opposite sense, whereby a transformed vector $\underline{U}_{\alpha''\beta''}$ with the transformed orthogonal components $U_{\alpha''}$ and $U_{\beta''}$ is obtained. In the $\alpha'', \beta''$ system, the counter system now has constant orthogonal components corresponding to a counter system vector $\overline{U''}_{\alpha''\beta''}$ resting in the counter system, while the co-system represents alternating variables corresponding to a vector $\overline{U'}_{\alpha''\beta''}$ rotating with twice the frequency. If therefore, these alternating components in the transformed orthogonal components $U_{\alpha''}$ and $U_{\beta''}$ are averaged out in a following smoothing stage, then the orthogonal components $\overline{U''}_{\alpha''}$ and $\overline{U''}_{\beta''}$ of the counter system vector are obtained in the $\alpha'', \beta''$ system which rotates in the opposite sense. A subsequent transformation back into the reference system fixed in space then furnishes the counter system vector $\overline{U''}_{\alpha\beta}$ fixed in space, and the entire fundamental can be described by the sum vector of the co-system vector $\overline{U'}_{\alpha\beta}$ obtained in the manner described above and of the counter system vcector $\overline{U''}_{\alpha\beta}$ obtained in the manner just described.

The transformation of the actual vector $\underline{U}_{\alpha\beta}$ into the $\alpha'', \beta''$ system corresponds to the transformation (4) with a transformation angle $-\phi_s$. This is exactly the transformation which the vector rotator 4' already described must also execute. Thus, such a vector rotator with the transformation elements $\cos \phi_s$, $-\sin \phi_s$ can be used for the transformation into the $\alpha'', \beta''$ system. Similarly, the transformation from the $\alpha'', \beta''$ system back into the $\alpha, \beta$ system fixed in space is equal to the transformation by means of the already described vector rotator 2'. FIGS. 1 and 2 show, with the corresponding vector rotators 2" and 4" as well as the interposed smoothing stage 3" for the two transformed orthogonal components, the necessary building blocks for determining the counter system, where the summing junction 19 adds the two vectors vectorially. The ⅔ transformer 20 furnishes, corresponding to the relation (2) the individual voltages therefrom according to (8).

As compared to the co-system amplitude, the counter system amplitude as a rule is only small. Therefore, the design of the smoothing stage 3' presents no difficulties in determining the co-system. However, the smoothing stage 3" must suppress the oscillations of high frequency which are generated by the co-system in the $\alpha''$, $\beta''$ system. This is facilitated by the fact that transformed orthogonal components of the entire actual vector are not the smoothed, but rather the vector $\underline{U}_{\alpha''\beta''} - \overline{U'}_{\alpha''\beta''}$ belonging to the difference between the overall system and the co-system is smoothed. This vectorial difference is advantageously already formed in the reference system, fixed in space, by subtraction in a summing junction 18 which precedes the vector rotator 2".

Figure 3:
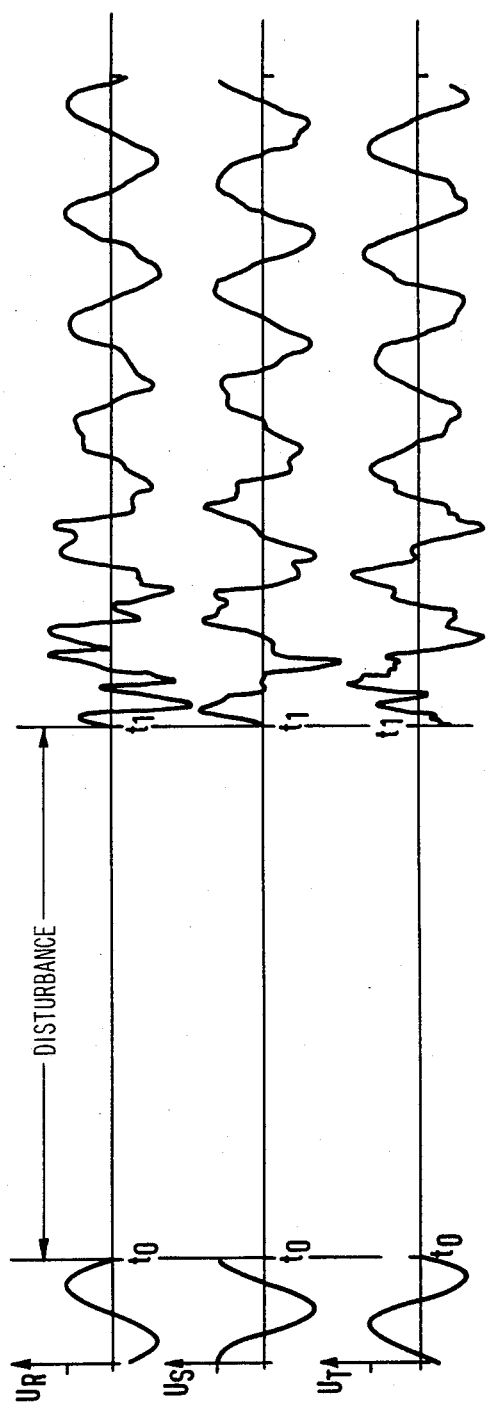
FIG. 3 illustrates a three-phase network voltage system with a voltage failure.

In FIG. 4 shows the output signal of the 3 2 transformer 1 (i.e., the orthogonal components $U_\alpha$ and $U_\beta$, fixed in space of the actual vector $\underline{U}_{\alpha\beta}$) which are normalized; for greater clarity, of the undisturbed amplitude (the latter is the same as the co-system fundamental amplitude $\overline{U}'$ for the undisturbed symmetrical network) for the voltage system show in FIG. 3. These normalized orthogonal components correspond therefore, in a symmetrical network, to the cosine and sine of the phase angle describing the undisturbed network. It is assumed here that $\phi^* = 0$, i.e., the frequency of rotation of the rotating $\alpha', \beta'$ system is slaved to the frequency of the network in such a manner that the $\alpha'$ axis rotates with the actual vector $\underline{U}_{\alpha\beta}$ in rigid phase relationship. Therefore, the normalized orthogonal vectors in the left undisturbed region are equal to the transformation elements. At the time $t = t_0$, the voltage monitor 13 indicates the break of the voltage amplitude, and the control device 12 issues a switching signal S for opening the switch 11. The frequency of the transformation elements is, therefore, no longer determined by the control deviation $\overline{\phi}'_{\alpha'} - \phi^*$. However, in order to make the necessary transformation elements immediately available to the vector rotators of the device when the network comes back, the transformation frequency is controlled during the network disturbance for the duration of the network disturbance by a stored frequency value.

Provision can be made for the control device 12 of FIG. 1, to store, when a network disturbance occurs, the frequency value $f_s$ which occurred last at the frequency control input of the vector oscillator 9 and 10 and which corresponds to the actual fundamental at this point in time, and to utilize this stored value for the frequency control of the transformation elements during the disturbance. Since this controlled operation is required only during the network disturbance, the switch 11 can also be implemented as a double throw switch which switches between one type of controlled operation (frequency control by the controlled deviation) and another (frequency control by the stored frequency value).

On the one hand, however, it is sufficient to preset a frequency value predetermined for the average value of the network frequency instead of the network fundamental determined just prior to the disturbance, particularly the nominal frequency (potentiometer 15). On the other hand, this predetermined frequency value can also be impressed during controlled operation, on the frequency control input of the vector oscillator 9 and 10, so that, if the network is present (switch 11 closed), only the small controlled deviation between the network frequency and the nominal frequency needs to be leveled out.

In FIG. 4, the shape of the transformation elements during the disturbance is shown by dashed lines. While by operating the switch 11 at the time $t_0$, a frequency jump occurs at the frequency control input of the integrator 9, so that the frequency of the dashed curves changes relative to the undisturbed region (this is barely noticeable in FIG. 4), transformation elements for the vector rotator are already available when the network returns (time $t_1$), and their transformation frequency corresponds largely to the actual network frequency. However, the returning network sets in again with a phase when is uncontrollably changed relative to the transformation elements.

The dashed lines of FIG. 4 represent for $t > t_1$ the waveform cos $\phi_s$ and sin $\phi_s$ for the case where the servo control does not switch on when the network returns, i.e., the transformation elements are not synchronized with the recurring fundamental of the network. This illustrates, that in the steady-state condition of the returning network, a considerable phase shift is present which in part is caused by the fact that, after the network disturbance, the fundamental sets in with an unknown phase, and which is in part caused by the deviation of the network frequency from the nominal frequency, so that a continuously increasing phase shift is obtained in the further course.

It should be emphasized that the orthogonal components shown for the returning network always completely describe the instantaneous condition of the network; they, therefore, contain, at any point in time, the complete information regarding the frequencies, phase and amplitudes of the fundamental and all harmonics which are present in the recurring network.

FIG. 5 shows the fundamental present in the network and the harmonics, of which the harmonic frequency with the order $n=3$, as well as reapidly decaying higher order frequency are particularly pronounced. The $\alpha$ component of the harmonic $n=3$ exhibits a substantially higher amplitude than the $\beta$ component. The corresponding vector of this harmonic, fixed in space, therefore, does not describe a uniform rotation with a circular locus in the $\alpha$, $\beta$ system, but a rotation with an elliptical locus. The reason for this is that this harmonic is present in the individual phase voltages with different amplitude and phase and, therefore, represents a strongly asymmetrical system. Such asymmetries are, of course, also possible at other frequencies but are less distinctly visible in FIG. 4.

If the switch 11 is not closed at the time $t_1$ of the return of the network, the $\alpha'$, $\beta'$ system continues to rotate at the nominal frequency as is indicated by the dashed lines of FIG. 4. In this case, the vector rotator transforms the orthogonal components $U_\alpha$ and $U_\beta$ into a rotating $\alpha'$, $\beta'$ system, the $\alpha'$ axis of which does not fall in the direction of the vector $\underline{U}_{\alpha\beta}$. If the orthogonal components formed by the vector rotator 2' and not transformed into the nonsynchronous $\alpha'$, $\beta'$ system are now resolved, a main share with only slightly variable orthogonal components will initially be found. This is the co-system fundamental of the network which is given in the $\alpha$, $\beta$ system by $\overline{U'_\alpha} = \overline{U'} \cos \overline{\phi'_\alpha}$ and $\overline{U'_\beta} = \overline{U'} \sin \overline{\phi_\alpha}$, and appears in the non-synchronously rotating $\alpha'$, $\beta'$ system with $\overline{U'_{\alpha'}} = \overline{U'} \cos (\overline{\phi'_\alpha} - \phi_s) = \overline{U'} \cos \overline{\phi'_{\alpha'}}$ or $\overline{U'_{\beta'}} = \ldots$ and is variable with the difference frequency of the nominal frequency and the network frequency. (FIG. 6).

The fundamental counter system which appears in the $\alpha$, $\beta$ system fixed in space as a vector $\overline{U''}_{\alpha\beta}$ rotating at the fundamental frequency occurs in the rotating $\alpha'\beta'$ system as a vector which rotates with the opposite sense and twice the frequency. At the same time, however, the vector $\underline{U'}_{\alpha\beta}$ ($n=3$) belonging to the third order co-system, which rotates in the $\alpha$, $\beta$ system, fixed in space, in the same direction at three times the speed and occurs in the rotating $\alpha'$, $\beta'$ system as a vector $\underline{U'}_{\alpha'\beta'}$ ($n=3$) which now rotates only at twice the frequency. Therefore, the fundamental counter system vector and the harmonic third-order co-system vector practically coincide in FIG. 6.

Figure 6:
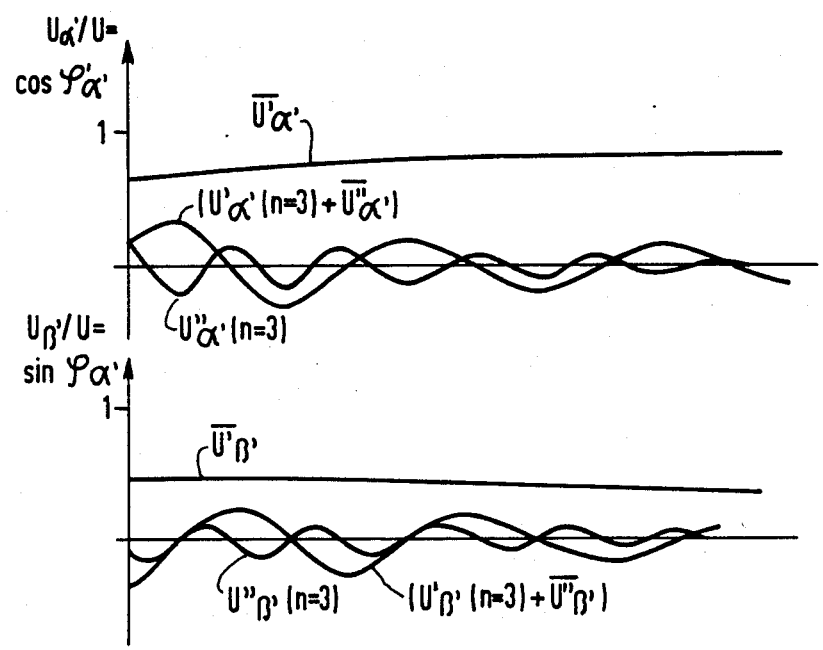
FIG. 6 illustrates the frequency components of the frequency transformed orthogonal components.

FIG. 6 further also contains, of course, the third-order counter system vector which rotates in the rotating $\alpha'$, $\beta'$ system at four-times the fundamental frequency. Higher-order harmonics are omitted in FIG. 6 for the sake of easier understanding.

If the behavior in time of the vector rotator 2' and the vector analyzer 5 could be ignored and if the filter 3' could already operate as in the steady state when the network returns, only the transformed orthogonal components belonging to the co-system fundamental vector $\overline{U'_{\alpha'}}$ and $\overline{U'_{\beta'}}$ would appear at the output of the smoothing stage or the vector analyzer. By closing the switch 11, the phase servo system could then be switched on immediately when the network came back, whereby the transformation frequency (frequency of rotation of the $\alpha'$, $\beta'$ system) could gradually be readjusted in such a way that the $\alpha'$ axis rotates synchronously with the co-system vector, i.e., the transformed co-system component $\underline{U'}_{\beta'}$ proportional to sin $\phi'_{\alpha'}$ disappears (in the following $\phi^* = 0$ is always assumed). Since, however, this idealized state does not apply, the waveforms shown in FIG. 9 are obtained, the switch 11 being closed only after the point in time $t_2$.

The vector rotator 2' needs to execute only multiplications, as shown by (4), and therefore can execute the transformation within a few microseconds. Therefore, the output signal of the vector rotator 2' actually represents the superposition of the signals shown in FIG. 6 practically immediately after the return of the network.

The smoothing stage 3' is designed as a filter which primarily must suppress the harmonics shown in FIG. 6. Depending on the application, certain asymmetry and transient conditions can be expected when the network power retuns. If the returning power sets in, for instance, with a fundamental counter system which decays only slowly, the filter 3' must be designed primarily for twice the fundamental (corresponding to the counter system vector with oppositely rotating counter system vector). However, the case can also occur that the fundamental counter system is relatively small or decays rapidly, but that harmonics which are not a multiple of the network frequency, interfere quite a bit much. The filter is advantageously designed so that it filters out the respectively most critical harmonics (as a rule, at least the critical harmonic with the lowest order number) to such an extent that its residual amplitude present amounts to less than 2% of the fundamental amplitude. Usually, a simple yielding member with the complex transfer function $1/(1+s+T_1)$ is not sufficient.

Figure 7:
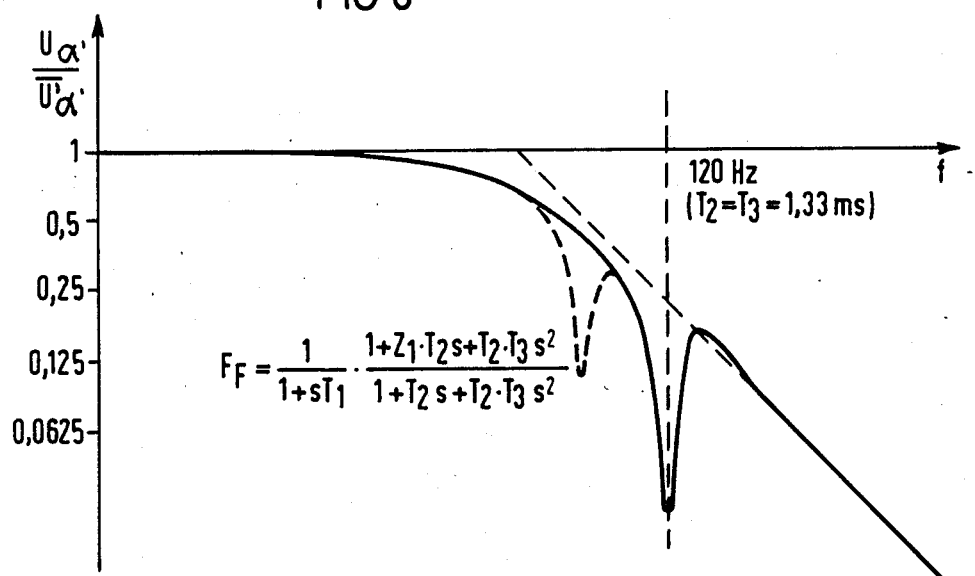

FIGS. 7 and 8 show the design and the transfer function of a preferred smoothing stage which is tuned for suppressing a critical harmonic at 120 Hz. The mentioned yield stage with the time constant $t_1 = 6.3$ msec is tuned to a corner frequency of 25 Hz and therefore lets the transformed co-system components, the frequency of which is only the difference between the nominal frequency and the network fundamental, pass practically unchanged. A subsequent filter with the transfer function $(1 = Z_1 \cdot T_2 \cdot s + T_2 \cdot T_3 \cdot s^2)/(1 + T_2 \cdot s + T_2/T_3 \cdot s^2)$ is designed so that with the time constants $T_2 = T_3 = 1.3$ msec and the resistor $Z_1$ the position as well as width and depth of the critical frequency suppression (120) is provided. The mentioned design of such a filter is obvious to one of skill in the art and requires no further explanation. If several critical frequencies are to be suppressed, further pronounced frequency suppressions can, of course, be arranged by adding further such filter stages, as is indicated in the amplitude response curve of FIG. 7 at 50 Hz.

In FIG. 9, the output signal of the filter 3' is shown by dashed lines for the range of power restoration for $t_1 \ldots t_2$. The output signals are again normalized to the actual co-system amplitude, and the exponential, slowly rising signal curve shows that the filter settles only slowly to the values $\overline{\cos \phi'_{\alpha'}} = \cos(\phi'_{\alpha} - \phi_s)$ and $\overline{\sin \phi'_{\alpha'}} = \sin(\phi'_{\alpha} - \phi_s)$. According to the difference frequency between the transformation angle $\phi_s$ and the fundamental phase $\overline{\phi'_{\alpha}}$ the final values of these signals vary only slowly in the steady-state condition.

From the actual (i.e., not normalized) output signals $\overline{U'_{\alpha'}}$ and $\overline{U'_{\beta'}}$ of the filter 3', the vector analyzer 5 now forms the amount $\overline{U'} = \sqrt{\overline{U'_{\alpha'}}^2 + \overline{U'_{\beta'}}^2}$ as well as the trigonometric functions $\cos \overline{\phi'_{\alpha'}}$, $\sin \overline{\phi'_{\alpha'}}$ belonging to the angle coordinate $\overline{\phi'_{\alpha'}}$. The purpose of the vector analyzer can therefore be visualized as a k/p converter which forms, from the orthogonal components, the polar magnitude and angle coordinates, where subsequently the angle coordinate is converted into the trigonometric functions by a sine-cosine generator. However, it is simpler not to execute the trigonometric functions via the intermediate computation of the angle coordinate, but to calculate them directly. In German Offenlegungsschrift No. 29 19 786, a circuit is described which contains such a vector analyzer as well as a vector rotator and which is constructed as an analog module from pulse width multipliers. While the pulse width multiplication is carried out at a high computing rate, signal feedback is provided in the vector analyzer, in addition to a slight amount of smoothing, to form the value of the magnitude coordinate required for calculating the sine and cosine. As a cosequence thereof, transients initially occur in the vector analyzer so that the pair of angle signals of the vector analyzer shown in FIG. 9 as solid lines at first does not follow the idealized dashed lines which should result from the input signal made available by the filter. Since, however, the vector analyzer settles very much faster than the filter, these deviations manifest themselves practically only in the time interval $t_1 \ldots t_2$. Since the angle coordinate is given by $\overline{\phi'_{\alpha'}} = \tan^{-1} \overline{U'_{\beta'}}/\overline{U'_{\alpha'}}$, the effect of the slower settling filter is cancelled in the quotient $\overline{U'_{\beta'}}/\overline{U'_{\alpha'}}$ so that, at time $t_2$, reliable information on the instantaneous phase $\overline{\phi'_{\alpha'}}$ regarding the axis) can already be obtained even though the determination of the fundamental amplitude itself is not yet reliable. Since, however, the servo control, by which the $\alpha'$ axis is slaved to the direction of the co-system vector, depends only on this phase $\overline{\phi'_{\alpha'}}$, the servo control can already be connected at a time $t_2$, i.e., the switch 11 is closed.

FIG. 9 now shows how, due to the servo control, the transformation phase is levelled out for $t > t_2$ according to the control condition $\sin \overline{\phi'_{\alpha'}} = \sin \phi^* = 0$. Since the initial control time of the phase control circuit with anticipatory control can be chosen very short, the final values $\cos \overline{\phi'_{\alpha'}} = 1$ and $\sin \overline{\phi'_{\alpha'}} = 0$ are reached very soon (time $t_3$). Therefore, the balanced state which the transformation angle $\phi_s$, which is taken off as the phase of the fundamental co-system, is synchronous with the actual phase of the actual fundamental co-system of the network is reached after about 8 msec.

Figure 10:
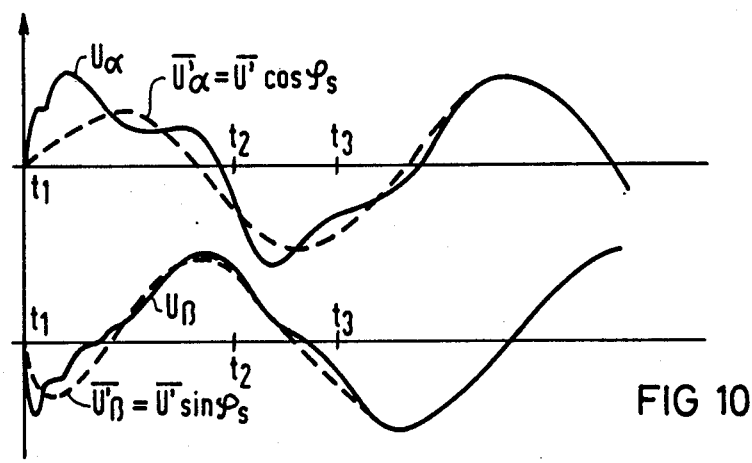

In FIG. 10, the output signal of the $\frac{2}{3}$ transformer 1, shown previously in FIG. 4, is repeated, but these orthogonal components $U_\alpha$ and $U_\beta$, fixed in space, are now compared with the output signal of the multiplier 4$\alpha'$, i.e., with the measured values for the orthogonal components $\overline{U'_\alpha}$ and $\overline{U'_\beta}$, fixed in space. In the range $t_1 \ldots t_2$, the switch 11 is open and the transformation elements take the course already shown dashed in FIG. 4, from which the corresponding measured values $\overline{U'_\alpha} = \overline{U'} \cos \phi_s$, $\overline{U'_\beta} = \ldots$ are generated through multiplication by the magnitude signal of the vector analyzer 5. Since the magnitude initially rises only slowly due to the mentioned transients, the dashed lines in FIG. 10 are obtained for this region. In this time span, these curves correspond to a locus of the vector $\overline{U'_{\alpha\beta}}$, the length of which increases gradually in accordance with the transient of the filter, to the actual amplitude and the direction of which oscillates about the direction given by the transformation angle, according to the behavior of the vector analyzer. The transformation angle, which ultimately is taken off as the measured value for the phase of the fundamental, is initially still in no relationship with the actual fundamental system.

During the initial control time $t_2 \ldots t_3$ of the phase control loop, however, the transformation angle is made to approach the actual phase of the fundamental system. Therefore, at the time $t_3$, the measured values merge with the values of the actual orthogonal components of the fundamental co-system. Deviations between the solid lines for the actual voltage waveform and the dashed lines for the measured values are now due only to the co-oscillation counter system and the harmonics of the actual values. In the time interval $t_2 \ldots t_3$, the locus of the vector described by the measured values therefore approaches the actual network voltage vector to the extent that the phase control loop regulates the rotating $\alpha'$ axis to the direction of the actual vector.

As has already been explained, reliable information regarding the phase of the co-system is already available at the time $t_2$ from the quotient $\overline{U'_{\beta'}}/\overline{U'_{\alpha'}} = \tan \overline{\phi'_{\alpha'}}$. Basically, it is therefore already possible at this point to make reliable statements regarding the zero crossings of the network voltage, which is desirable in many cases. If, in particular, the instantaneous phase difference between the actual vector and the transformation elements is measured at the time $t_2$ and the phase of the transformation elements is changed as fast as possible by this value, this means that the $\alpha'$ axis is rotated at this point in time practically in a step-wise fashion into the direction of the actual vector. The signal $\sin \phi'_{\alpha'}$ in FIG. 9 would therefore assume the value zero in step-wise fashion. Thereby, the initial control time of the phase control loop, which still needs to regulate out the difference frequency between the stored anticipatory frequency $f_0$ and the network frequency used after the network disturbance, is shortened substantially.

For this process of fast synchronization, the additional frequency value $f_z$ or the supplemental angle $\Delta\phi_z = 2\pi\int f_z - dt$ is provided in the circuit according to FIG. 1 or 2.

In detail, the procedure is to form, in addition to the control deviation, a quantized value of the control deviation and to temporarily intervene into the control or regulation of the transformation frequency in such a manner that the phase $\phi_s$ of the transformation elements is adjusted by this quantized value. This process is controlled by the control device 12, which is explained for an analog implementation in connection FIGS. 11 to 13.

Figure 11:
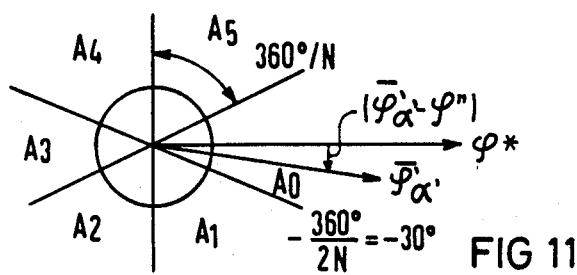

In FIG. 11, a direction which, for instance, if the reference value $\phi^* = 0$ is given, describes the position of the $\alpha'$ axis at the time $t_2$ is designated as $\phi^*$. Since, as was explained above, the vector analyzer 5 gives, at this time, while not yet the actual amount, through the angle coordinate, $\overline{\phi'_{\alpha'}}$ already the actual position of the co-system vector relative to the $\alpha'$ axis, dividing the possible range for the control deviation $\overline{\phi'_{\alpha'}} - \phi^*$ into six equal ranges $A_n$ (generally into N ranges with a width of $360°/2N = n + (\overline{\phi'_{\alpha'}} - \phi^*)$ modulo $360°/N$.

Figure 12:
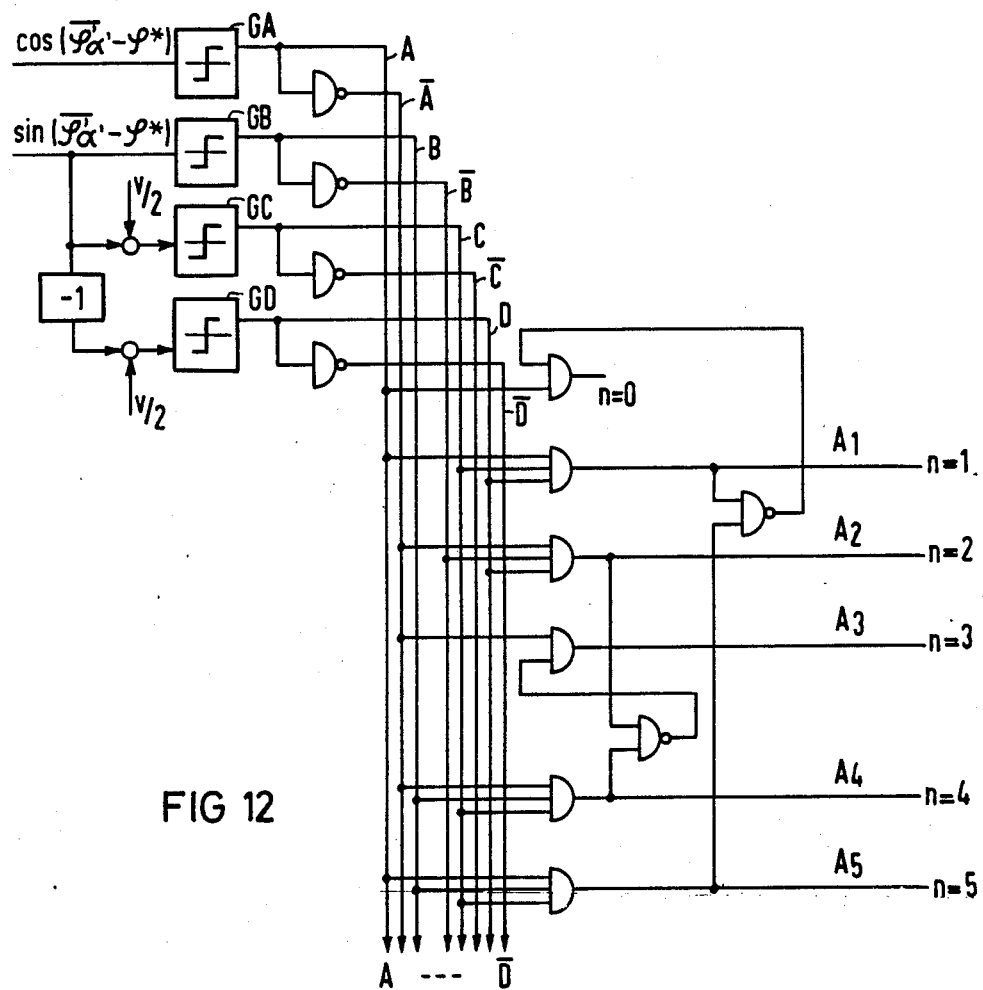
FIGS. 11 to 15 illustrate the design and operation of a supplemental device for rapid synchronization.
Figure 13:
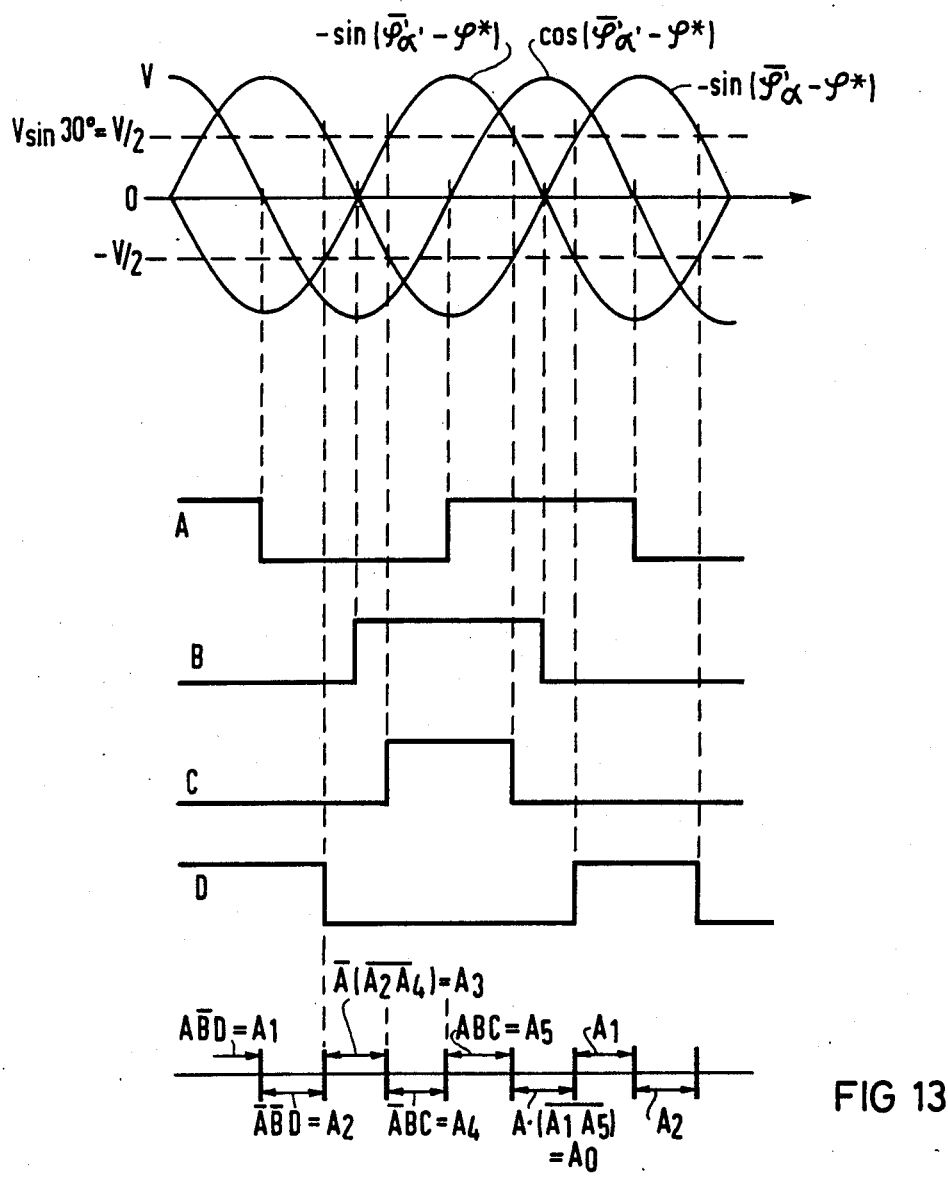

The corresponding circuit is shown in FIG. 12. The output signals $\cos\overline{\phi'_{\alpha'}}$ and $\sin\overline{\phi'_{\alpha'}}$ of the vector analyzer 5 are fed to limit indicators GA, GB, GC and GD, which form, according to FIG. 13, the signals A, B, C, and D. The outputs of these limit indicators are linked to each other via a logic circuit, where the logic circuit has a separate output for each angular range $A_1 \ldots A_5$. (An output associated with the range $A_0$ for the control deviation zero is not required.) The logical interlinkage insures that a signal is present only at the output which corresponds to the instantaneously occupied angular range. Thereby, an analog angle discriminator 30 is provided.

Figure 14:
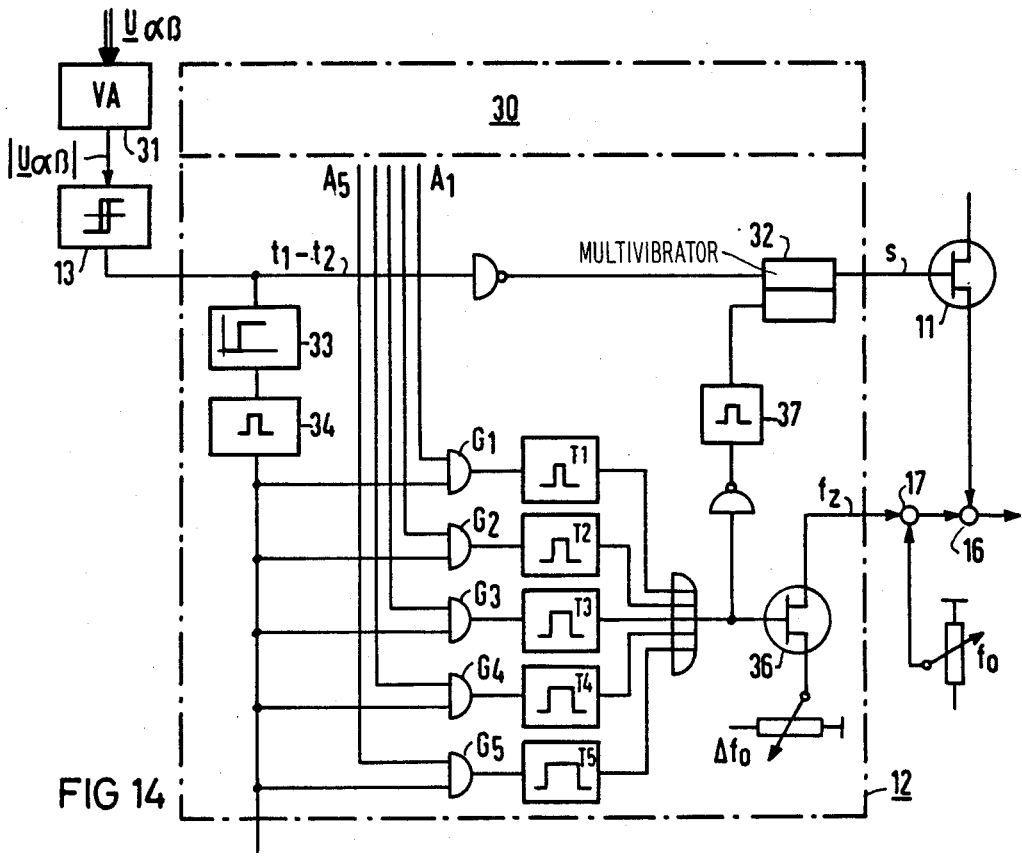

FIG. 14 shows a further part of the control device 12, in which the output signals $A_1$ to $A_5$ of this angle discriminator are processed further.

The network monitor 13 determines, for instance, by monitoring the network amplitude such as can be determined, for instance, by a vector analyzer 31 connected to the 3/2 transformer, the breakdown of the network. With the disappearance of the network amplitude, a multivibrator 32 is set, by means of which the switch 11 is opened (time $t_0$). If the network power returns, a delay stage 33 first establishes a delay time $t_1 \ldots t_2$ required, for instance, for starting up the vector analyzer 5, before the fast synchronization then furnishes, at this time $t_2$, a short pulse, by which AND gates $G_1 \ldots G_5$ which are connected to the outputs of the angle discriminator 30 are enabled. Each output of these gates is connected to one time delay stage with the activating times $T_1 \ldots T_5$. Since at the time $t_2$ only the signal output $A_n$ belonging to the instantaneous angular range carries a signal, therefore, only one given time delay stage assigned to the respective angular range is triggered. The time constants $T_n$ are chosen as $T_n = n \times T_o$. An OR gate 35 combines the output signals of the time delay stages $T_1 \ldots T_5$ to an "on" signal for a switch 36. This switch 36 thus connects, only during the time interval $n \times T_o$ belonging to the instantaneous angular range $A_n$, a constant voltage source to a summing junction 17, at which the additional frequency value $f_z$ formed in this manner is impressed on the stored frequency value $f_o$. Thereby, the fast synchronization after the return of the network power is initiated in such a manner that, in addition to the frequency control exercised by the stored value $f_o$ with the switch 11 open, the supplemental value $\Delta f_o = f_z$ is impressed for the duration $n \times T_o$, so that during this supplemental connection the $\alpha'$ axis rotates in an accelerated manner and is shifted by a phase angle $\Delta\phi_z$. $T_o$ and $\Delta f_o$ are matched here to each other in such a way that during the time $T_o$ the phase angle is shifted by 60°, i.e., the width of the corresponding phase range of FIG. 11. Therefore, $\Delta\phi_z = n \times 360°/N$ applies.

So that this temporary shift at the time $t_2$ cannot be disturbed by the phase control loop, by means of a further time delay stage 37 which is triggered only upon the opening of the switch 36 (time $t_3$) a suitable resetting pulse is applied to the multivibrator 32 which thereby recloses the switch 11 which was open during the network disturbance. Thus, the servo control sets in only for, after the network power returns, a fixed protection time $t_1 \ldots t_2$ for the settling down of the vector analyzer 5 as well as the fast synchronization time $(t_3 - t_2)$ for the adjustment of the transformation elements by the angle $\Delta\phi_z$ have expired.

Figure 15:
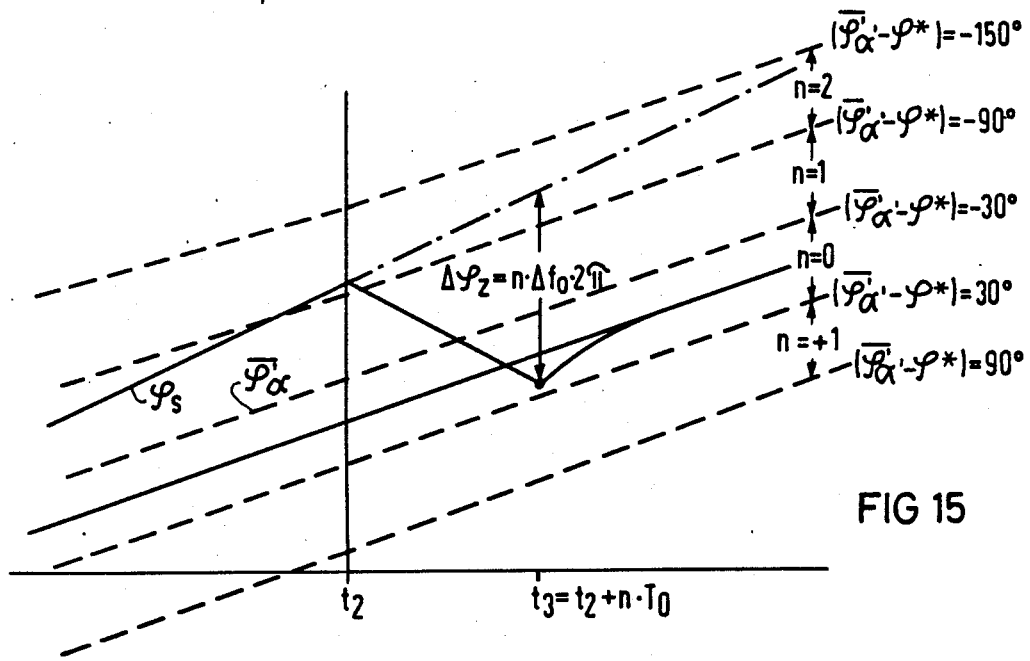

This process is shown in FIG. 15, where the angle between the axis fixed in space and the actual co-system fundamental vector is designated as $\overline{\phi'_\alpha}$. This angle $\overline{\phi'_\alpha}$ changes with the actual fundamental frequency. Since the switch 11 is open prior to the time $t_2$, the $\alpha'$ axis rotates with the stored frequency $f_o$ and encloses the angle $\phi_s$ with the $\alpha$ axis. If the $\alpha'$ axis is fixed as the reference axis for the phase control by the reference value $\phi^* = 0$, the control deviation $\overline{\phi'_{\alpha'}} - \phi^*$ has the value $\overline{\phi'_\alpha} - \phi_s$; in the example shown, it is therfore in the angular range $n = -1$, corresponding to a quantized value of $-120°$ for the control deviation.

Due to the additional frequency control in the time interval $t_2 \ldots t_3$, the $\alpha'$ axis now runs with changed (inverse) speed of rotation and the angle $\phi_s$ changes by the quantized value $\Delta\phi_z = -120°$. At the time $t_3$, only the remaining residual deviation is compensated by the phase control loop which is switched on via the switch 11.

Figure 16:
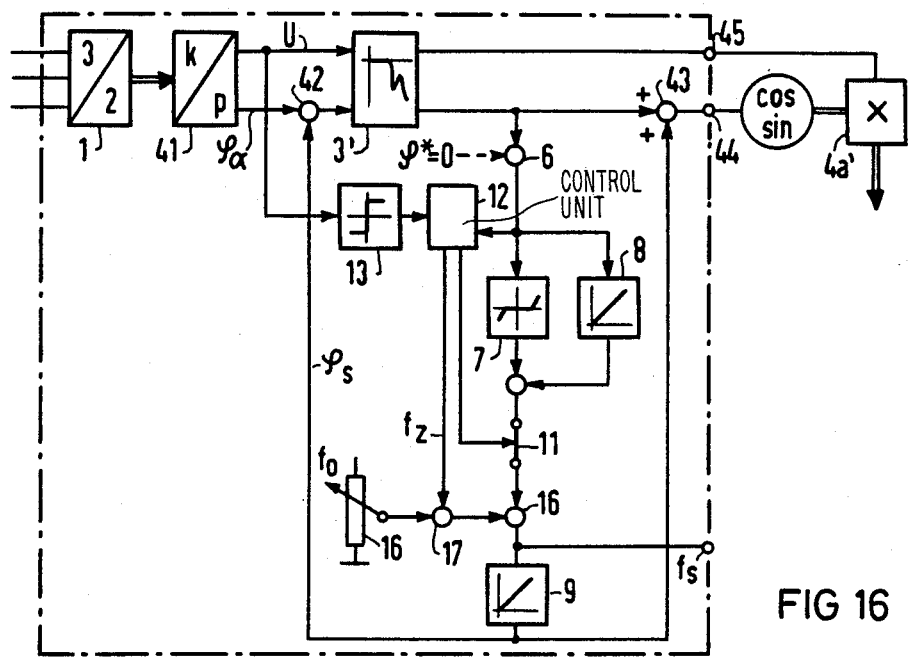
FIG. 16 illustrates a simplified arrangement with a polar mode of operation.

FIG. 16 shows schematically a somewhat simplified embodiment of the 3/2 transformer 1 in which the actual vector $\underline{U}_{\alpha\beta}$ generated by the 3/2 transformer) is not processed further in Cartesian coordinates, but is converted by means of a Cartesian/polar converter 41 into its polar coordinates U and $\phi_\alpha$. The transformation into the coordinate system rotating with the transformation frequency $f_s$ is accomplished by subtracting the transformation angle $\phi_s$ directly from the angle coordinate $\phi_\alpha$ (subtraction point 42). The two components 41 and 42 then furnish the actual vector $\underline{U}_{\alpha\beta}$ in the form of its transformed polar coordinate, also in the rotating $\alpha'$, $\beta'$ system. Consequently, then same physical information is obtained thereby as by the vector rotator 2' in FIG. 1, and if these polar coordinates were converted into orthogonal components by means of a p/k converter, then the smoothing stage 3' would have in both cases the same input and output variables, for a nearly symmetrical network of the form:

$$U_\alpha \approx U \cos \phi_a, U_\beta \approx U \sin \phi_a,$$

and therefore, the inputs $U_\alpha$, $\approx \cos \overline{(\phi_a-\phi_s)}$, $U_{\beta'} \approx U \sin \overline{(\phi_a-\phi_s)}$ and the outputs $\overline{U'_{\alpha'}} = \overline{U \cos (\phi_a-\phi_s)}$, $\overline{U'_{\beta'}} = \overline{U \sin (\phi_a-\phi_s)}$ If, however, the polar coordinates are smoothed by the smoothing stage 3', this results in a mean value $\overline{U'}$ for the magnitude which ultimately describes only the mean amplitude of the network voltage system, and would therefore also contain the counter system. Therefore, this device is suitable only if the determination of the counter system can be dispensed with (i.e., $\phi_a-\phi_s=0$ and $\overline{U) \cos (\phi_a-\phi_s)} \approx \overline{U'}$.

The mean value $\overline{(\phi_a-\phi_s)}$, i.e., the average angle coordinate in the $\alpha'$, $\beta'$ system, is equal to the angle coordinate $\phi'_{\alpha'}$ of the transformed co-system vector which is furnished and compensated by the vector analyzer 5 of FIG. 1 according to $\sin \phi'_{\alpha'} \approx \overline{U \sin (\phi_a-\phi_s)}/\overline{U}$ only under still even more restrictive conditions $\overline{(\phi_a-\phi_s)} \approx \overline{\sin (\phi_a-\phi_s)}$, $\overline{U'} \approx \overline{U}$. In the case of FIG. 16, the smoothing stage 3' therefore furnishes mean values, in which the other systems superimposed on the co-system are weighted differently as compared to FIGS. 1 and 2, so that the mean values of the polar coordinates of the transformed actual vector (FIG. 16) and the mean values of the transformed orthogonal components of the vector (FIGS. 1 and 2) approach each other only in particularly simple cases.

Under these simplified conditions, the transformation of the vector formed by averaging can be formed simply by adding the transformation angle $\phi_s$ and the averaged angle coordinate at the summing junction 43. At the terminals 44 and 45, values which describe, in accordance with the mentioned inaccuracies, the amount and phase of a vector which rotates approximately synchronously with the network are present in this case.

If the sine and cosine of the phase angle are required as the reference voltage system instead of the polar coordinates of this vector, the terminal 44 can be followed by a corresponding sine-cosine generator. The Cartesian coordinates fixed in space can be formed, if necessary, by a following multiplier corresponding to the multiplier 4a' in FIG. 1.

Since only the transformation angle $\phi_s$ itself is required as a transformation element for the transformations between the $\alpha$, $\beta$ system and the $\alpha'$, $\beta'$ system, it is found that a corresponding sine-cosine generator which follows the integrator 9 is unnecessary in the final control element.

Since furthermore the angle difference $\overline{\phi'_{\alpha'}} - \phi^*$ is used directly as the control deviation the possibility of simplifying the additional intervention into the frequency control for fast synchronization at the time $t_2$ exists. For, if a frequency controlled pulse generator is used in the frequency controlled final control element and its output pulses are counted by a counter which is always reset when an angle corresponding to a full revolution of 360° is reached, then it is only necessary as a fast synchronizing additional intervention for shifting the transformation angle, to change the counter content once by adding the correction angle $\Delta\phi_z$. In this case, the angle discriminator only requires an analog-digital converter which forms from the analog signal for the control deviation $\overline{\phi'_{\alpha'}} - \phi^*$ the corresponding digital angle $\Delta\phi_z$. The duration $t_2 \ldots t_3$ for the fast synchronization is thereby reduced to the processing time of the converter and of the angle addition at the counter. In this variant of fast synchronization, the transformation angle is changed therefore practically in one step at the time $t_2$ by the digitalized value of the control deviation (for $\phi^*=0$ the control deviation of the angles between the averaged network voltage and the $\alpha'$ axis) and the phase control loop then still needs to compensate for the angular inaccuracy only at the start of the control operation, which results from the resolution of the converter, while in controlled operation, phase shifts which result from the deviation of the network frequency from the anticipatory control frequency $f_0$.

This digitized variant of the fast synchronization can also be used in the device according to FIG. 1. A voltage-controlled quartz oscillator is used as the integrator 9, for example. Quartz oscillators have excellent frequency stability which can be changed within certain limits merely by applying an additinal control voltage. In the uncontrolled condition, the quartz oscillator vibrates with a constant frequency $f_0$, to which a subsequent pulse counter is matched so that it is always reset at a counter reading which corresponds to a full period of the nominal frequency. For the mentioned digital fast synchronization it is therefore only necessary to determine from the signal pair $\cos \overline{\phi'_{\alpha'}}$, $\sin \overline{\phi'_{\alpha'}}$ at the angle signal output of the vector analyzer the angle coordinate itself by means of a k/p converter (for $\phi^*=0$, therefore, the control deviation) and to digitize it by means of an analog/digital converter. At the time $t_1$, this digital value can then be added to a full adder at the output of the counter.

Since a vector analyzer, as far as its function is concerned, is a k/p converter for forming the amount and angle as well as a subsequent sine/cosine generator for converting the angle into the trigometric functions, a k/p converter can ultimately be used alone in the arrangement just described forming the angle coordinate used for digitizing from the output signals of the smoothing stage 3' directly. Since, however, vector analyzers are presently more easily realized than k/p converters, the preferred embodiment of FIG. 17 the vector analyzer is maintained. The component $\sin \overline{\phi'_{\alpha'}}$ at the angle signal output of the vector analyzer is added on the one hand directly as the actual value to the servo controller 7 and 8 but on the other hand, both trigonometric functions furnished by the vector analyzer are fed to an analog/digital converter 52. The conversion of the trigonometric functions into the corresponding angle itself is carried out in this case digitally by a microcomputer 53. This digital angle formation, while it is likewise a k/p conversion is, however, easy to carry out because of the normalized input voltages. The microcomputer 53 is always in operation only if the network monitor 13 indicates the start and end of a network disturbance and the switch 11 must be actuated in the manner already described.

The integrator 9 of the figure is replaced by the mentioned quartz oscillator 9a, the base frequency of which is $f_0$, with the following counter 50. The data bus at the output of the microcomputer 53 delivers a one-time pulse only at the time $t_1$ to the adder 51, which just happens to correspond to the digital value of the angle coordinate $\overline{\phi'_{\alpha'}}$ and causes the mentioned readjustment of the transformation angle. The counter 51 addresses the read-only memory 54 with the digital angle $\phi_s$. The output variables $\cos \phi_s$, $\sin \phi_s$ of read-only memory 54 are converted by means of a multiplying digital/analog converter $4b'$ into the analog signals $\overline{U'_\alpha}$, $\overline{U'_\beta}$, corresponding to the output signal of the multiplier $4a'$ in FIG. 1, and are processed further together with the components $\overline{U''_\alpha}$, $\overline{U''_\beta}$ of the counter system.

Thereby, the time interval $t_2 \ldots t_3$ in FIG. 15 is shortened substantially.

Figure 18:
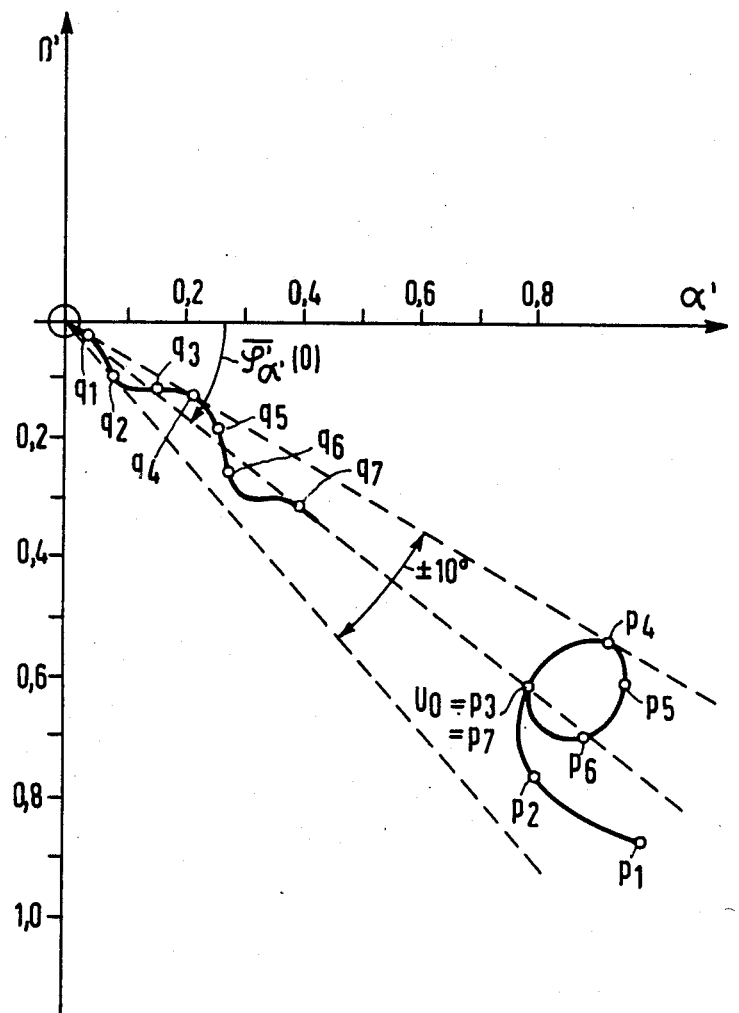

In FIG. 18, the locus of the vector described by the output signals of the entire device as shown. On this locus according to FIG. 18 is based the $\alpha'$, $\beta'$ system which rotates at this time with the nominal frequency $f_0$ because of the still open switch 11. Within the first 7 msec, the vector $U_{\alpha\beta}$ of the actual network contains a fundamental which can be described in comparison with the transformation element $\cos \phi_s$ by a difference angle designated with $\overline{\phi'_{\alpha'}(0)}$, where this difference angle changes only with the difference between the nominal frequency and the actual network fundamental. $U_0$ describes the basic state of the network, which belongs to this practically constant difference angle $\overline{\phi'_{\alpha'}(0)}$ and is given by $\cos \overline{\phi'_{\alpha'}(0)}$ and $\sin \overline{\phi'_{\alpha'}(0)}$, which practically therefore gives the normalized actual vector which belongs to the actual network fundamental. The harmonics present when the network power returns have the effect that the actual vector $U_{\alpha\beta}$ moves about the point $U_0$ within these first 7 msec. It is now the object of the device according to the invention to find the fundamental, i.e., to determine the point $U_0$ from this motion of the actual vector.

Figure 17:
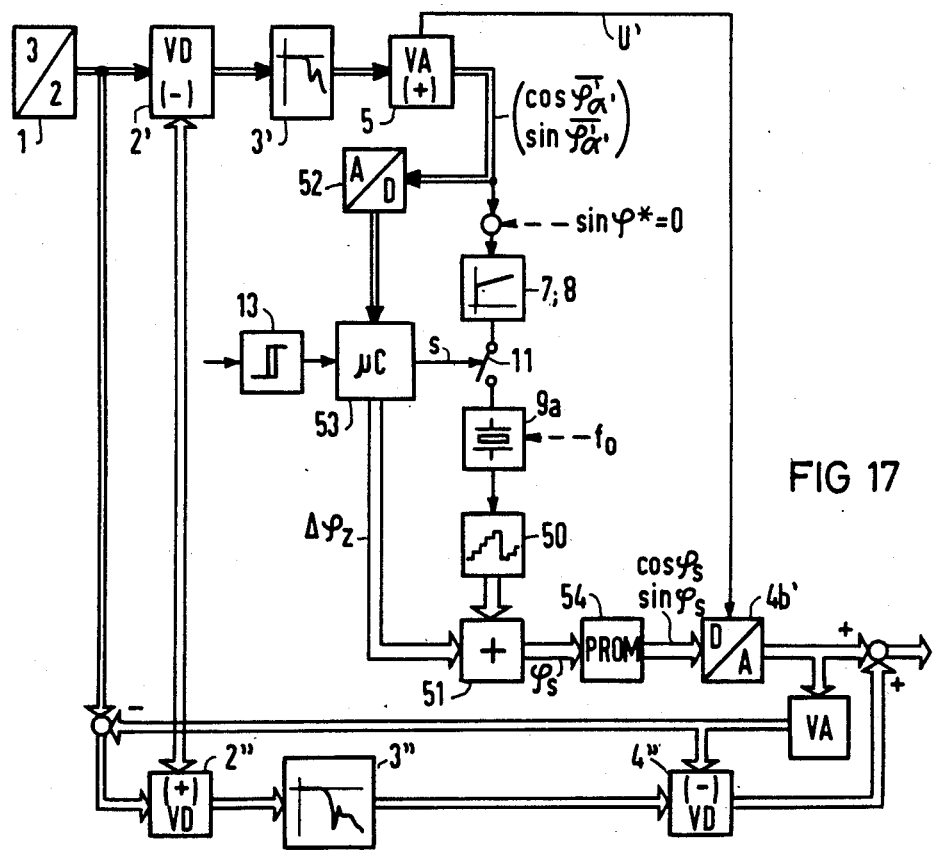
FIGS. 17 and 18 illustrate the design and signal waveform in a partly digitized embodiment.

The points $P_1 \ldots P_7$ now represent the end points of the vector which is fixed by the output signals of the vector analyzer 5 1 . . . 7 msec after the network power returns. At this time, the switch 11 in FIG. 17 is still open. If the vector analyzer were operating ideally, as was explained with the aid of the dashed lines in FIG. 7, these points would practically already coincide with the point $U_0$ since the inputs of the vector analyzer increase practically exponentially according to the transients of the filter $3'$, and this exponential increase is cancelled by the formation of the quotient $\overline{U'_{\beta'}}/\overline{U'_{\alpha'}}$ in the angle coordinate $\overline{\phi'_{\alpha'}} = \tan^{-1} \overline{U'_{\beta'}}/\overline{U'_{\alpha'}}$. The transient of the vector analyzer 5, however, has the effect that these points $P_1 \ldots P_7$ approach the actual point $U_0$ to be determined on the locus shown. Within the first 7 msec, the angle given by the points $P_1 \ldots P_7$ therefore varies by only about 10° about the actual value $U_0$ which is determined practically exactly even after a short time (in the example, 7 msec).

Thus, the time $t_2$ is already reached after 7 msec, at which time the switch 11 is closed. This has the effect that the $\alpha'$ axis is shifted practically instantaneously in step fashion by the angle belonging to the point $P_7$ in the system fixed in space because of the high computing speed of the microcomputer 53; i.e., the $\alpha'$ axis coincides at the point in time with the actual network vector. Since then the servo control is switched on, the $\alpha'$ axis moves from then on synchronously with the actual vector of the fundamental, the harmonics having been filtered out. The transformation element $\cos \phi_s$ then describes the co-system fundamental of the phase voltage or the network voltage system normalized to the actual co-system fundamental. To get from these normalized values to the actual fundamental, the corresponding transformation element is multiplied by the amount coordinate determined by the vector analyzer $5a$ in the digital-to-analog converter $4b'$ of FIG. 17. At the point in time $t_7$, a determined fundamental vector $\overline{U'_{\alpha\beta}}$ is accordingly obtained which agrees with the actual vector as to its direction, but the amount $\overline{U'}$ of which still deviates from the atual fundamental vector to the extent as to which the still settling filter $3'$ still furnishes an incorrect fundamental measured value $\overline{U'}$ for the actual fundamental amplitude. So that the point $P_7$ which represents the instantaneous actual vector $\underline{U}_{\alpha\beta}$ normalized to the actual amplitude U can be compared with the output of the converter $4b'$, the end point of the vector $\overline{U'_{\alpha\beta}}$ normalized to the same actual amplitude is shown by the point $q_7$. The same renormalization to the actual amount of the actual vector is furnished for the points $P_1 \ldots P_7$ by the points $q_1 \ldots q_6$. For $t > t_2$, the output variables of the converter $4b'$ exhibit a curve which leads practically in a straight line to the (actual) point $U_0$ to be determined.

Since $t_2$ is already reached very early, where the transformation elements are synchronous with the co-system fundamental, the frequency, phase and zero crossings of the co-system fundamental are already determined very early. Since the phase-synchronous transformation elements then also facilitate the operation of the smoothing stage $3'$ as well as of the components $2''$, $3''$ and $4''$ which are necessary for determining the counter system, the complete information on the fundamental of the network is obtained within a few milliseconds.

What is claimed is:

1. A method for determining a reference voltage synchronous with a network, for the control unit of a network controlled converter, in the case of an a-c voltage network containing harmonics after a network disturbance, comprising, in the presence of an a-c voltage network:
   (a) obtaining frequency variable transformation elements of a first frequency transformation;
   (b) obtaining network voltage components fixed in space from measured values of the a-c voltage network and using said transformation elements for translating said components into two frequency transformed orthogonal components;
   (c) smoothing the frequency transformed orthogonal components and determining the angle coordinate correlated to the smoothed components;
   (d) by use of a phase control regulating the frequency of the transformation elements to a disappearing control deviation between said angle coordinate derived from the frequency transformed orthogonal components and a given phase reference value and
   (e) taking off as a reference voltage system synchronous with the network, either the transformation elements normalized for constant amplitude or the co-system components transformed back by a frequency transformation inverse to the first frequency transformation; and in case of a network disturbance:
   (f) using a frequency control instead of said phase control, said frequency control of the transformation elements using a stored frequency value for the duration of the network disturbance; and
   (g) switching back to phase control only after the a-c voltage network has returned.

2. The method according to claim 1, and further comprising giving the frequency of the transformation elements anticipatory control with a frequency value for the mean value of the network frequency with the a-c voltage network present.

3. The method according to claim 1, and further including forming orthogonal frequency transformed counter system components in a second frequency transformation inverse to the first frequency transformation, smoothing said components and transforming them back with a transformation inverse to the second frequency transformation, and superposing the co-system components transformed back and the counter system components transformed back and taking off said superposed components as the reference voltage system synchronous with the network.

4. The method according to claim 3, further including subjecting the difference between of the a-c voltage components fixed in space and the co-system components transformed back to the second frequency transformation.

5. The method according to claim 4, and further including smoothing and filtering to match the suppression of critical harmonics, said smoothing matched to an amplitude factor of less than about 2% for the lowest critical harmonic.

6. The method according to claim 5, and further comprising regulating the control deviation with a control loop gain which increases more than proportionally for increasing values.

7. The method according to claim 1, and further including, in addition to the control deviation, forming a quantized value of the control deviation and temporarily intervening into the control or regulation of a transformation frequency in such a manner that the phase of the transformation elements is adjusted by the quantized value.

8. The method according to claim 7, comprising intervening temporarily in the control of the transformation frequency only after a predetermined delay time after the end of a network disturbance and before the phase control is switched on.

9. The method according to claim 8, comprising switching the phase control on only after the completion of the intervention.

10. The method according to claim 9, wherein said intervening includes controlling the frequency of counting pulses for a counter by the control deviation; forming the quantized value of the control deviation by digitization; as a temporary intervention into the transformation frequency, adding the digitized control deviation to the counter reading; and using the counter reading as a digital value for the phase of the transformation elements.

11. The method according to claim 9, comprising forming the quantized value n by entering an integral number N according to a control deviation modulo 360°/N; and intervening into the control with an additional frequency value $f_z$ corresponding to $$\int_{\Delta t} f_z \delta t = n$$

for the duration $\Delta t$, for the frequency control.

12. An apparatus for determining a reference voltage synchronous with a network, for the control unit of a network controlled converter, especially in the case of an a-c voltage network containing harmonics after a network disturbance, in the presence of an a-c voltage network comprising:

(a) a network determining stage for forming two orthogonal a-c voltage components fixed in space;

(b) a first vector rotator for transforming the components fixed in space into a rotating reference system;

(c) a first smoothing stage for the transformed components, for forming transformed co-system components;

(d) a phase difference former for forming the control deviation between the phase of the transformed co-system components and a predetermined phase reference value;

(e) a final control element following the phase difference former for forming the components, fixed in space, of a reference axis of the rotating reference system, said components coupled as frequency variable transformation elements to the angle signal input of said first vector rotator;

(f) a switch between said phase difference former and said final control element by which the entered frequency of the transformation elements can be switched between a control by a stored frequency value in the event of a network disturbance, and a control, by which the control deviation formed by the phase difference former can be compensated; and (g) means by which either the variable frequency transformation element or the co-system components transformed back and corresponding to the transformation element weighted with the amplitude of the co-system are taken off as a reference voltage system synchronous with the network.

13. Apparatus according to claim 12, and further including a subtracting means for subtracting component by component the transformed back co-system components from the a-c voltage network components, fixed in space, furnished by said network determining stage; a second vector rotator having the transformation elements as inputs for transformation into a reference system rotating in the opposite direction; a following second smoothing stage for forming the orthogonal transformed counter system components; a further vector rotator for transforming the transformed counter system components back into the reference system fixed in space; and a summing junction for the component-wise addition of the transformed back counter system components and the transformed back co-system components.

14. Apparatus according to claim 12, wherein said phase difference former contains a vector analyzer for determining the amplitude and the phase of the co-system components referred to the rotating reference system, the final control element contains an integrating sine-cosine generator, especially with an oscillator frequency controlled by the control deviation followed by a counter controlling a sine-cosine generator; and a multiplier addressed by the amplitude output of the vector analyzer and the function outputs of the sine-cosine function generator forms the transformed back co-system components in the reference system fixed in space.

15. Apparatus according to claim 14, wherein the sine-cosine generator contains a voltage controlled quartz oscillator which, for no-load oscillation, is tuned to the stored mean frequency value and is controlled, when the phase control is switched on, by the control deviation, for driving the counter.

16. Apparatus according to one of the claims 12 to 15, and further including an angle discriminator for forming quantized value of the control deviation, preferably an analog-digital converter and means for adjusting the phase of the transformation elements with the quantized value after the end of the network disturbance.

* * * * *